(12) United States Patent
Murata

(10) Patent No.: US 9,204,210 B2
(45) Date of Patent: Dec. 1, 2015

(54) DATA RELAY APPARATUS AND FUNCTION CONTROL METHOD THEREFOR

(75) Inventor: Hiroshi Murata, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 463 days.

(21) Appl. No.: 13/699,037

(22) PCT Filed: Mar. 18, 2011

(86) PCT No.: PCT/JP2011/056565
§ 371 (c)(1),
(2), (4) Date: Nov. 20, 2012

(87) PCT Pub. No.: WO2011/155242
PCT Pub. Date: Dec. 15, 2011

(65) Prior Publication Data
US 2013/0064538 A1   Mar. 14, 2013

(30) Foreign Application Priority Data
Jun. 9, 2010  (JP) ................. 2010-132058

(51) Int. Cl.
H04J 14/00 (2006.01)
H04Q 11/00 (2006.01)

(52) U.S. Cl.
CPC ....... H04Q 11/0067 (2013.01); *H04Q 11/0071* (2013.01); *H04Q 2011/0079* (2013.01)

(58) Field of Classification Search
CPC ........... H04B 10/07955; H04B 10/077; H04B 10/00; H04B 10/272; H04B 10/27; H04B 10/25; H04J 14/0221; H04J 14/0227; H04Q 2011/0079; H04Q 2011/0064; H04L 41/0833

USPC ......... 398/6, 38, 94, 171, 197, 66–72, 62, 64, 398/97, 173, 181, 126, 174, 175, 176, 155, 398/135–139
See application file for complete search history.

(56) References Cited

U.S. PATENT DOCUMENTS 8,000,602 B2 * 8/2011 Haran et al. ..................... 398/72
8,346,082 B2 * 1/2013 Yoon et al. ...................... 398/72
(Continued)

FOREIGN PATENT DOCUMENTS

| JP | 2003-229820 | | 8/2003 |
|---|---|---|---|
| JP | 2004-64749 | | 2/2004 |
| JP | 2004-289780 | | 10/2004 |
| JP | 2007-174364 | | 7/2007 |
| JP | 2008-533944 A | | 8/2008 |
| JP | 2009-27538 | | 2/2009 |
| JP | 2009-055393 A | | 3/2009 |
| JP | 2009-212594 A | | 9/2009 |
| JP | 2009-239571 | | 10/2009 |
| JP | 2009-260882 | | 11/2009 |
| JP | 2010114830 | * | 2/2010 |
| JP | 2010-114830 | | 5/2010 |
| WO | WO 2006/101371 A1 | | 9/2006 |
| WO | WO2006101371 | * | 9/2006 ............... H04B 7/26 |

*Primary Examiner* — Hibret Woldekidan
(74) *Attorney, Agent, or Firm* — Drinker Biddle & Reath LLP

(57) ABSTRACT

A data relay apparatus R (e.g., one included in an ONU) that performs data transfer from one port to another port reduces power consumption by performing control to limit a receive function of a receiving unit 1 at the one port under at least one of conditions that a control instruction is received from a communication partner (e.g., an OLT) connected to the one port (port 2), and that information about control is notified to the communication partner; and allows the receive function to recover when a predetermined recovery condition is satisfied (e.g., a lapse of a predetermined period of time or arrival of a predetermined time). In this case, since recognition that the receive function is limited can be shared with the communication partner, the communication partner can prevent itself from performing data transmission to the data relay apparatus R when the receive function is limited.

16 Claims, 18 Drawing Sheets

(56) References Cited

U.S. PATENT DOCUMENTS

| | | | |
|---|---|---|---|
| 8,509,624 B2 * | 8/2013 | Mattahedin | 398/135 |
| 8,521,030 B2 * | 8/2013 | Aoki | 398/135 |
| 8,565,601 B2 * | 10/2013 | Nakura et al. | 398/72 |
| 8,687,960 B2 * | 4/2014 | Hirano et al. | 398/58 |
| 8,705,965 B2 * | 4/2014 | Sugawa et al. | 398/67 |
| 8,774,621 B2 * | 7/2014 | Mukai | 398/72 |
| 8,934,770 B2 * | 1/2015 | Mukai et al. | 398/38 |
| 8,948,595 B2 * | 2/2015 | Kazawa et al. | 398/67 |
| 9,042,737 B2 * | 5/2015 | Tanaka | 398/155 |
| 2002/0027690 A1 * | 3/2002 | Bartur et al. | 359/152 |
| 2006/0034611 A1 * | 2/2006 | Li | 398/135 |
| 2010/0111523 A1 * | 5/2010 | Hirth et al. | 398/25 |
| 2012/0045202 A1 * | 2/2012 | Jiang et al. | 398/38 |
| 2012/0148246 A1 * | 6/2012 | Mukai et al. | 398/58 |
| 2014/0079396 A1 * | 3/2014 | Hirano et al. | 398/67 |
| 2014/0105603 A1 * | 4/2014 | Melts et al. | 398/67 |
| 2014/0193150 A1 * | 7/2014 | Mukai et al. | 398/67 |

* cited by examiner

DATA RELAY APPARATUS AND FUNCTION CONTROL METHOD THEREFOR

TECHNICAL FIELD

The present invention relates to a data relay apparatus that performs data transfer from one port to another port, and a function control method for the data relay apparatus.

BACKGROUND ART

FTTH (Fiber To The Home) using an optical fiber as communication lines that connect computers at home or in an office (home side) to a service provider (central office side) is widely spread. The basic type of the FTTH is P2P (Point To Point), and the central office side and the home side are connected to each other by an optical fiber in a one-to-one relationship. In this case, a line connected to a computer on the home side is a metal line, and a line connected to an upper network on the central office side is also mainly a metal line (note, however, that there may be an optical line case). Therefore, when a metal line and an optical fiber are connected to each other, a media converter serving as a relay apparatus is installed at an end of the optical fiber (see, for example, Patent Literature 1). Each media converter is used in a power-on state all the time, regardless of whether a computer on the home side is performing communication.

Meanwhile, in order to cope with a rapid increase in the number of users using FTTH and to effectively use an optical fiber, a PON (Passive Optical Network) system is used. The PON system is a system in which an optical line terminal serving as a central station is connected to optical network units installed in a plurality of subscribers' houses, by an optical fiber network where a single optical fiber is split into a plurality of optical fibers by an optical coupler (see, for example, Patent Literature 2). When the plurality of optical network units simultaneously perform transmission to the optical line terminal, pieces of transmit data collide with one another. Thus, the optical line terminal provides permission regarding transmit timing and the amount of transmit data, to the optical network units. In response to the permission, the optical network units perform transmission in an upstream direction at the timing and amount permitted by the optical line terminal, to the optical line terminal (see, for example, Patent Literature 3).

Data transmission in a downstream direction from the optical line terminal to the optical network units is multiplexed in a time-division manner. Although transmitted data physically reaches each optical network unit, each optical network unit reads a header portion of a transmitted frame and thereby determines whether the frame is destined therefor (destined for the optical network unit or a user network under the control thereof). If, as a result of the determination, the frame is destined for the optical network unit, then the optical network unit takes in the frame, or otherwise discards the frame. Note that the optical line terminal serving as the central station operates with power-on all the time. Note also that each optical network unit is used in a power-on state all the time, regardless of whether a computer under the control thereof is performing communication.

CITATION LIST

Patent Literatures

Patent Literature 1: Japanese Unexamined Patent Publication No. 2003-229820 (FIG. 5)
Patent Literature 2: Japanese Unexamined Patent Publication No. 2004-64749 (FIG. 4)
Patent Literature 3: Japanese Unexamined Patent Publication No. 2007-174364 (FIG. 5)

SUMMARY OF INVENTION

Technical Problem

A media converter such as that described above performs transmission and reception of idle signals even during a period during which valid data (e.g., a MAC frame defined in IEEE 802.3) is not relayed. Hence, even when there is no valid data to be relayed, the media converter consumes power in the same manner as when relaying valid data.

On the other hand, in the PON system, each optical network unit consumes certain power by receiving data even if the data is not destined therefor. Most of the power consumption per user using FTTH is consumed by the optical network unit. This is because the optical line terminal and upper apparatuses are shared among multiple users. Thus, power consumption per user is low. However, since each optical network unit is basically used by a single user, power consumption per user is equal to the power consumption of the optical network unit.

In view of such conventional problems, an objective of the present invention is to achieve more power savings mainly in a data relay apparatus used on the home side, over the conventional apparatuses.

Solution to Problem (1) The present invention is to provide a data relay apparatus that performs data transfer from one port to another port, the data relay apparatus including: a transmitting unit and a receiving unit provided for each port; a relay processing unit provided between the receiving unit at the one port and the transmitting unit at another port, and performing a data relay process; and a function control unit for performing control to limit a receive function of the receiving unit at the one port to thereby reduce power consumption when there is provided at least one of a condition that a control instruction is received from a communication partner connected to the one port and a condition that information about control is notified to the communication partner, the function control unit allowing the receive function to recover when a predetermined recovery condition is satisfied.

A data relay apparatus configured in the above-described manner can reduce the power consumption thereof by limiting a receive function of a receiving unit at a port. In addition, control to limit the receive function in this manner is performed under at least one of the conditions that a control instruction is received from a communication partner connected to the port, and that information about control is notified to the communication partner. Therefore, recognition that the receive function is limited can be shared with the communication partner. By this, the communication partner can prevent itself from performing data transmission to the data relay apparatus when the receive function is limited. In addition, the data relay apparatus can return to its original state when a predetermined return condition is satisfied. In this manner, the data relay apparatus can achieve power savings without failing in data reception.

(2) Further, the present invention is to provide a data relay apparatus that performs data transfer from one port to another port, the data relay apparatus including: a transmitting unit and a receiving unit provided for each port; a relay processing unit provided between the receiving unit at the one port and the transmitting unit at another port, and performing a data relay process; and a function control unit for performing control to limit a receive function and a transmit function of the receiving unit and the transmitting unit at the one port to thereby reduce power consumption when there is provided at least one of a condition that a control instruction is received from a communication partner connected to the one port and a condition that information about control is notified to the communication partner, the function control unit allowing the receive function and the transmit function to recover when a predetermined recovery condition is satisfied.

A data relay apparatus configured in the above-described manner can reduce the power consumption thereof by limiting a receive function and a transmit function of a receiving unit and a transmitting unit at a port. In addition, control to limit the functions in this manner is performed under at least one of the conditions that a control instruction is received from a communication partner connected to the port, and that information about control is notified to the communication partner. Therefore, recognition that the functions are limited can be shared with the communication partner. By this, the communication partner can prevent itself from performing data transmission to the data relay apparatus when the functions are limited. In addition, the data relay apparatus can return to its original state when a predetermined return condition is satisfied. In this manner, the data relay apparatus can achieve power savings without failing in data reception.

(3) Further, the present invention is to provide a data relay apparatus that performs data transfer from one port to another port, the data relay apparatus including: a transmitting unit and a receiving unit provided for each port; a relay processing unit provided between the receiving unit at the one port and the transmitting unit at another port, and performing a data relay process; and a function control unit for performing control to limit a receive function of the receiving unit at the one port and a partial function of the relay processing unit to thereby reduce power consumption when there is provided at least one of a condition that a control instruction is received from a communication partner connected to the one port and a condition that information about control is notified to the communication partner, the function control unit allowing the receive function and the partial function to recover when a predetermined recovery condition is satisfied.

A data relay apparatus configured in the above-described manner can reduce the power consumption thereof by limiting a receive function of a receiving unit at a port and a partial function of the relay processing unit. In addition, control to limit the functions in this manner is performed under at least one of the conditions that a control instruction is received from a communication partner connected to the port, and that information about control is notified to the communication partner. Therefore, recognition that the functions are limited can be shared with the communication partner. By this, the communication partner can prevent itself from performing data transmission to the data relay apparatus when the functions are limited. In addition, the data relay apparatus can return to its original state when a predetermined return condition is satisfied. In this manner, the data relay apparatus can achieve power savings without failing in data reception.

(4) In the data relay apparatus according to any of (1) to (3) described above, the predetermined recovery condition includes any of following:

(a) a lapse of a predetermined period of time; and
(b) arrival of a predetermined time.

In this case, the data relay apparatus can return to its original state based on a lapse of a predetermined period of time or arrival of a predetermined time.

(5) In addition, in the data relay apparatus in the above-described (4), the function control unit may set the predetermined period of time or the predetermined time itself.

In this case, since the data relay apparatus set the predetermined period of time or the predetermined time itself, control is easy.

(6) In addition, in the data relay apparatus in the above-described (4), the function control unit may set a period of time or a time instructed by the communication partner, as the predetermined period of time or the predetermined time.

In this case, since the predetermined period of time or the predetermined time can be specified by the communication partner, the length of time during which the function(s) is limited or the timing of recovery can be changed according to the conditions. In addition, the communication partner accurately grasps a period of time during which the receive function of the data relay apparatus is limited, and can perform data transmission after a lapse of the period of time.

(7) In addition, in the data relay apparatus in any of the above-described (1) to (3), a current state of a function serving as a target for control performed by the function control unit may be notified to the communication partner.

In this case, the communication partner can securely know the current state of the data relay apparatus that changes by control performed by the function control unit.

(8) In the data relay apparatus according to any of (1) to (3) described above, the function control unit may measure a period of time elapsed from when data is received last from the communication partner, and perform the control to limit a function when the measured period of time has reached a predetermined period of time.

In this case, when there is no data reception for a predetermined period of time, the data relay apparatus can autonomously achieve power savings.

(9) In the data relay apparatus according to any of (1) to (3) described above, the function control unit may measure a frequency of receiving data from the communication partner and perform the control to limit a function when the measured frequency is less than or equal to a predetermined value.

In this case, when the data reception frequency is reduced to a predetermined value or less, the data relay apparatus can autonomously achieve power savings.

(10) In the data relay apparatus according to (8) or (9) described above, only when data is relayed from the one port to another port, the function control unit may consider as data reception.

In this case, data that is not relayed from one port to another port is not considered as "data". By this, an elapsed time or frequency can be measured based on valid data. For example, in a state in which data that does not need to be relayed arrives at the port frequently, such data is, so to speak, ignored, enabling to implement power savings by a limitation in function.

(11) In addition, in the data relay apparatus in the above-described (4), when a function is limited, a period of time before allowing the function to recover or a time at which the function recovers may be notified to the communication partner.

In this case, after recovery, without the need for the data relay apparatus to notify the communication partner of the fact of the recovery, the communication partner can grasp beforehand the timing at which the communication partner is allowed to perform transmission to the data relay apparatus.

(12) In the data relay apparatus according to any of (1) to (3) described above, when the function control unit performs the control to limit a function itself instead of by an instruction from the communication partner, it is preferable that the function control unit postpones an actual performing of the control to limit a function, during a period of time required from when a notification indicating the limitation reaches the communication partner until data having already been transmitted before the communication partner stops transmission reaches the data relay apparatus.

In this case, the function control unit waits to limit the function(s) until a notification reaches the communication partner and already transmitted data reaches the data relay apparatus. Thus, the data relay apparatus can securely receive data having already been transmitted thereto from the communication partner right before limiting the function(s). In this manner, the data relay apparatus can develop high-reliability cooperation with the communication partner.

(13) In the data relay apparatus according to any of (1) to (3) described above, when the function control unit performs the control to limit a function itself instead of by an instruction from the communication partner, the function control unit may postpone an actual performing of the control to limit a function, during a period of time from when a notification indicating the limitation reaches the communication partner and is recognized by the communication partner until a notification indicating the recognition reaches from the communication partner.

In this case, the function control unit waits to limit the function(s) until a notification reaches the communication partner and a notification indicating acknowledgement of the notification reaches the data relay apparatus. Thus, the data relay apparatus can securely receive data having already been transmitted thereto from the communication partner before limiting the function(s). In this manner, the data relay apparatus can develop high-reliability cooperation with the communication partner.

(14) In the data relay apparatus according to any of (1) to (3) described above, a plurality of modes are defined in advance for a mode of limiting a function, and the function control unit may select any of the modes.

In this case, the way to limit the function(s) can be minutely set.

(15) In the data relay apparatus according to the above-described (14), a plurality of limited operating modes are prepared in connection with a period of time required to return to a normal operating mode from a limited operating mode where a function is limited, and circuits that shift to limited operation in each limited operating mode may be determined in advance based on a startup time of the respective circuits.

In this case, an appropriate selection can be made according to the period of time specified by the communication partner, taking also into account a startup time required for a return for each circuit.

(16) In the data relay apparatus according to any of (1) to (3) described above, the limitation in function may refer to suspension of the function.

In this case, by suspension of the function(s), power consumption can be reduced to the lowest level.

(17) Further, the present invention is to provide a function control method for a data relay apparatus that performs a relay process on data received from one port, to transmit the data from another port, the method including: performing control to limit a receive function of a receiving unit at the one port to thereby reduce power consumption when there is provided at least one of a condition that a control instruction is received from a communication partner connected to the one port and a condition that information about control is notified to the communication partner, and thereafter allowing the receive function to recover when a predetermined recovery condition is satisfied.

In the function control method for a data relay apparatus such as that described above, the power consumption of the data relay apparatus can be reduced by limiting the receive function of a receiving unit at a port. In addition, control to limit the receive function in this manner is performed under at least one of the conditions that a control instruction is received from a communication partner connected to the port, and that information about control is notified to the communication partner. Therefore, recognition that the receive function is limited can be shared with the communication partner. By this, the communication partner can prevent itself from performing data transmission to the data relay apparatus when the receive function is limited. In addition, the data relay apparatus can return to its original state when a predetermined return condition is satisfied. In this manner, in the function control method, power savings can be achieved without failing in data reception.

Advantageous Effects of Invention

According to the data relay apparatus and function control method for the data relay apparatus of the present invention, power savings can be achieved without failing in data reception.

DESCRIPTION OF EMBODIMENTS

{First Embodiment}

A first embodiment of the present invention will be described with reference to the drawings.

<<P2P System>>

Figure 1:
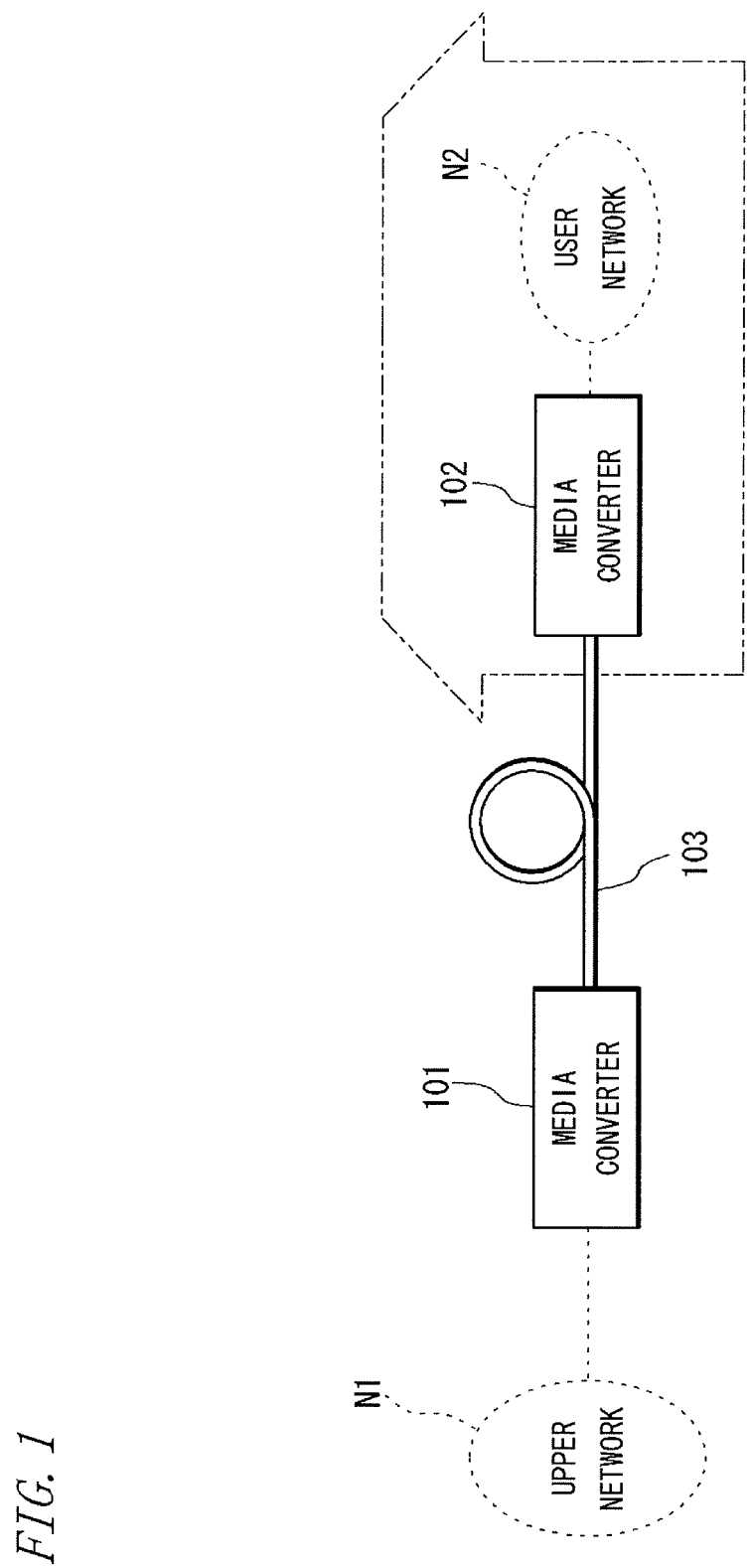
FIG. 1 is a diagram of an FTTH connection using a P2P system.

FIG. 1 is a diagram of an FTTH connection using a P2P system. In the drawing, a media converter 101 on the central office side is connected to an upper network N1 by a metal line. A media converter 102 on the home side is connected to a user network N2 by a metal line. The two media converters 101 and 102 are connected to each other by an optical fiber 103. Each of the media converters 101 and 102 has a function as a data relay apparatus and relays data between the optical fiber and the metal line.

<<PON System>>

Figure 2:
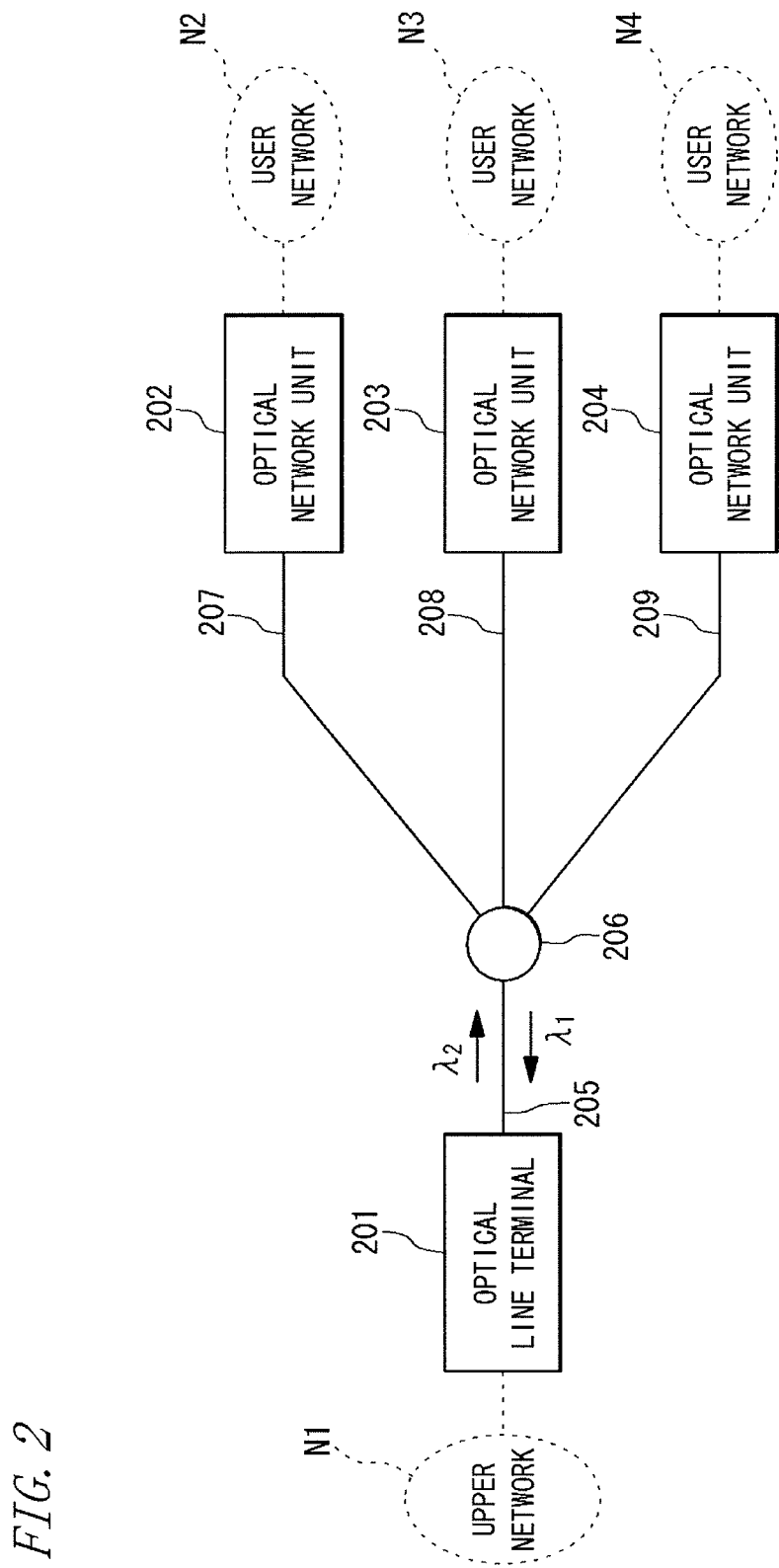
FIG. 2 is a diagram of a connection by a PON system which is an example.

FIG. 2 is a diagram of a connection by a PON system which is an example.

In the drawing, an optical line terminal 201 is installed as a central station for a plurality of optical network units 202, 203, and 204, and the optical network units 202, 203, and 204 are installed in their respective PON system subscribers' houses. A single optical fiber (main line) 205 connected to the optical line terminal 201 is split into a plurality of optical fibers (branch lines) 207, 208, and 209 by an optical coupler 206, by which an optical fiber network is provided. The optical network units 202, 203, and 204 are respectively connected to the ends of the optical fibers 207, 208, and 209 split by the optical coupler 206.

The optical line terminal 201 is connected to an upper network N1 by a metal line. The optical network units 202, 203, and 204 are connected to their respective user networks N2, N3, and N4 by metal lines. Each of the optical line terminal 201 and the optical network units 202, 203, and 204 has a function as a data relay apparatus and relays data between the optical fiber and mainly the metal line.

Note that although FIG. 2 shows three optical network units 202, 203, and 204 in total, it is possible to split an optical fiber into, for example, 32 optical fibers by the single optical coupler 206 to connect 32 optical network units. Note also that although in FIG. 2 only one optical coupler 206 is used, by cascading a plurality of optical couplers, more optical network units can be connected to the optical line terminal 201.

In an upstream direction from each of the optical network units 202, 203, and 204 to the optical line terminal 201, data using an optical signal of a wavelength $\lambda 1$ is transmitted. The transmission is performed under the control of the optical line terminal 201. The transmission control is performed such that a plurality of optical network units do not simultaneously perform transmission in the upstream direction. On the other hand, in a downstream direction from the optical line terminal 1 to each of the optical network units 202, 203, and 204, data using an optical signal of a wavelength $\lambda 2$ is transmitted by a time-division multiplexing scheme. For the wavelengths $\lambda 1$ and $\lambda 2$, for example, the values in the following ranges are assumed for 10-Gbps signals defined in IEEE 802.3av.

1260 nm$\leq \lambda 1 \leq$1280 nm 1575 nm$\leq \lambda 2 \leq$1580 nm

<<Overall Configuration of a Data Relay Apparatus>>

Next, data relay apparatuses according to the embodiment of the present invention which are included in the media converter 102 of FIG. 1 provided on the home side and in the optical network units 202 to 204 of FIG. 2 will be described in detail.

Figure 3:
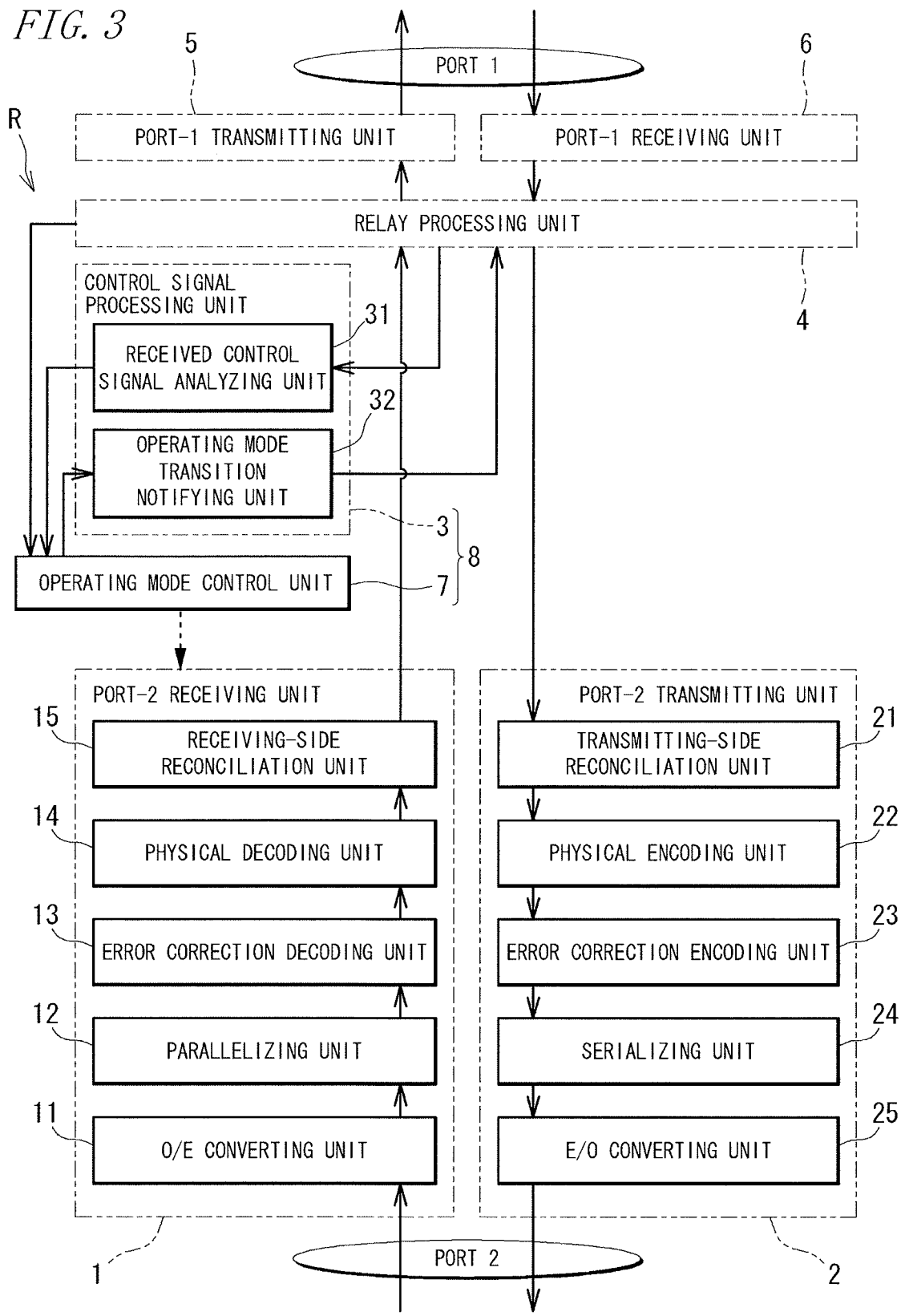
FIG. 3 is a block diagram (1/2) showing a configuration of a data relay apparatus according to a first embodiment which is included in, for example, optical network units.
Figure 4:
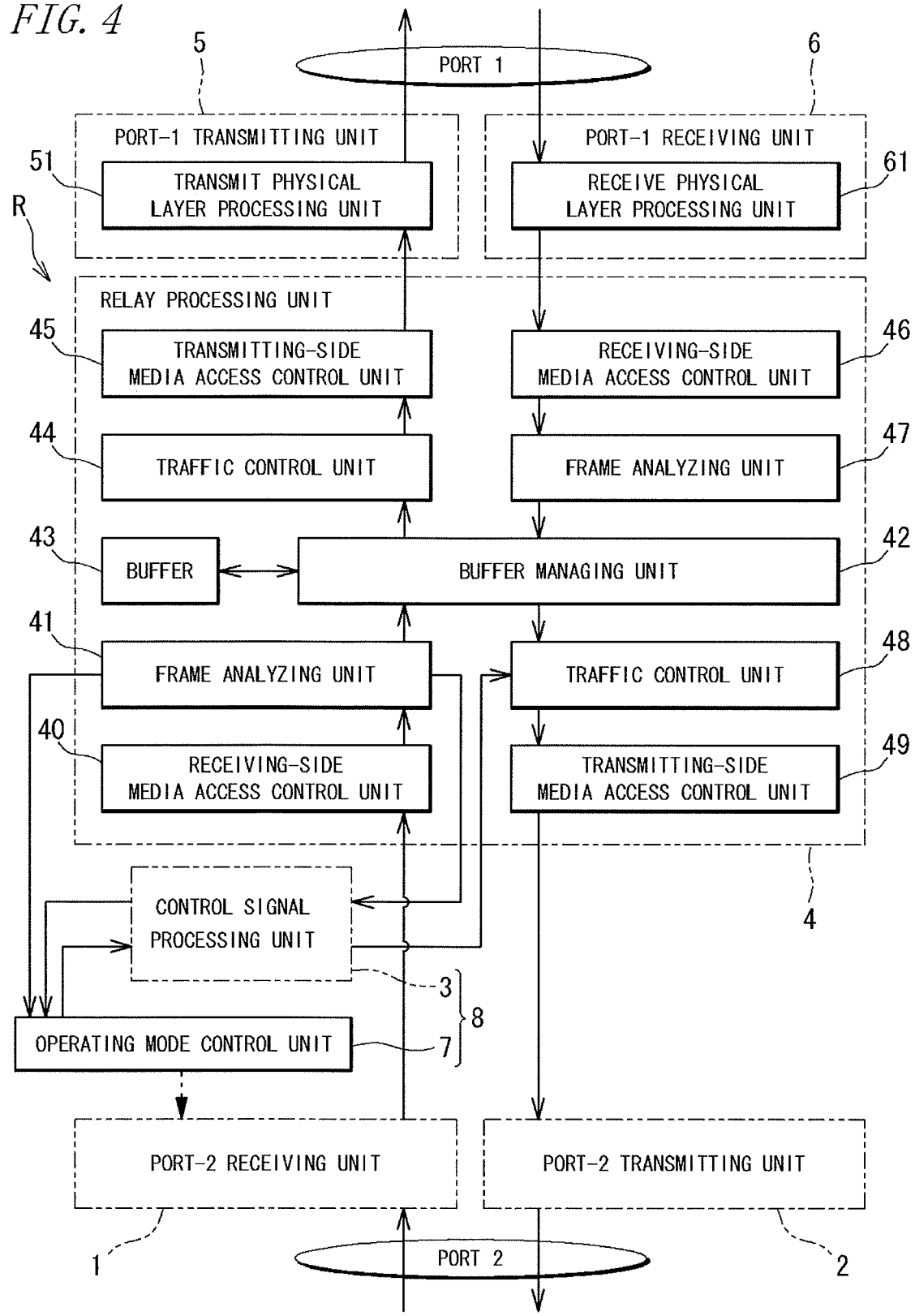
FIG. 4 is a block diagram (2/2) showing the configuration of the data relay apparatus according to the first embodiment.

FIGS. 3 and 4 are block diagrams representing a single diagram by two sheets, and those blocks shown in detail in one diagram are briefly described in the other diagram. Specifically, FIGS. 3 and 4 are block diagrams showing a configuration of a data relay apparatus R according to the first embodiment which is included in, for example, the optical network units 202 to 204. Note that since a data relay apparatus included in the media converter 102 also has substantially the same configuration, a data relay apparatus included in each optical network unit in the PON system will be described as a representative example.

In FIGS. 3 and 4, the metal line for the user network N2/N3/N4 (FIG. 2) is connected to a port 1. The optical fiber 207/208/209 (FIG. 2) is connected to a port 2 through an optical multiplexing/demultiplexing unit which is not shown, and the optical line terminal 201 (FIG. 2) is connected to the end thereof. Note that although this example shows a data relay apparatus having two ports, there is also a data relay apparatus having more ports. The data relay apparatus R includes a port-2 receiving unit 1 and a port-2 transmitting unit 2 which are provided for the port 2; a control signal processing unit 3; a relay processing unit 4; a port-1 transmitting unit 5 and a port-1 receiving unit 6 which are provided for the port 1; and an operating mode control unit 7. The relay processing unit 4 is provided between the port-2 receiving unit 1 and the port-1 transmitting unit 5 and between the port-1 receiving unit 6 and the port-2 transmitting unit 2, and performs the process of relaying data.

The port-2 receiving unit 1 receives data transmitted from the optical line terminal 201 which is a communication partner. The port-2 transmitting unit 2 transmits data to the optical line terminal 201. The port-1 transmitting unit 5 transmits data to the user network. The port-1 receiving unit 6 receives data from the user network. The port-1 transmitting unit 5 and the port-1 receiving unit 6 have a transmit physical layer processing unit 51 and a receive physical layer processing unit 61, respectively.

The port-2 receiving unit 1 includes an O/E converting unit 11 that performs amplification, quantization, and timing extraction in addition to O/E conversion (conversion from an optical signal to an electrical signal); a parallelizing unit 12 that converts the electrical signal into a parallel signal; an error correction decoding unit 23 that decodes forward error correction (FEC); a physical decoding unit 14 that decodes the signal; and a receiving-side reconciliation unit 15 that performs reconciliation with a receiving-side media access control unit 40. Note that in the case of Ethernet (registered trademark)-PON, the receiving-side reconciliation unit 15 performs, for example, discarding of data or transmission of data based on a logical link identifier (LLID), and restoration of a preamble.

The port-2 receiving unit configured by these units (11 to 15) can be used in two modes: a normal operating mode in which the port-2 receiving unit exerts 100% of its function, and a limited operating mode in which the function is limited.

Mode selection is performed by a function control unit 8 configured by the operating mode control unit 7 and the control signal processing unit 3.

Here, the expression "the function is limited" includes a reduction in performance in addition to the suspension of the function. Typically, the function can be suspended by cutting off power supply. In addition, the function can be suspended by, for example, stopping a clock signal transition or fixing the state of a memory element (fixing at a reset state). The performance can be reduced by actions such as reducing the frequency of a clock signal, reducing power supply voltage, or reducing current supplied from the power supply. By limiting the function of the port-2 receiving unit 1 in this manner, the power consumption of a circuit can be reduced, enabling to achieve power savings. Note, however, that when the function of the port-2 receiving unit is limited, it results in a state in which communication less than or equal to a predetermined error rate cannot be performed or a state in which, in the worst case, reception cannot be performed at all.

On the other hand, the port-2 transmitting unit 2 includes: a transmitting-side reconciliation unit 21 that performs reconciliation with a transmitting-side media access control unit 49; a physical encoding unit 22 that encodes a signal; an error correction encoding unit 23 that encodes forward error correction; a serializing unit 24 that converts an electrical signal into a serial signal; and an E/O converting unit 25 that performs waveform shaping and drives an E/O conversion device in addition to E/O conversion (conversion from an electrical signal to an optical signal).

Next, the relay processing unit 4 first includes, in the downstream direction from the port-2 receiving unit 1 to the port-1 transmitting unit 5, the receiving-side media access control unit 40; a frame analyzing unit 41 that analyzes a frame to determine a destination; a buffer managing unit 42; a traffic control unit 44 that performs traffic control and frame conversion; and a transmitting-side media access control unit 45 to the port 1. The buffer managing unit 42 is connected to a buffer 43.

The relay processing unit 4 further includes, in the upstream direction from the port-1 receiving unit 6 to the port-2 transmitting unit 2, a receiving-side media access control unit 46 for the port 1; a frame analyzing unit 47 that analyzes a frame to determine a destination; the buffer managing unit 42; a traffic control unit 48 that performs traffic control and frame conversion; and the transmitting-side media access control unit 49.

The control signal processing unit 3 includes, for example, a received control signal analyzing unit 31 and an operating mode transition notifying unit 32. The received control signal analyzing unit 31 analyzes a control signal obtained from the frame analyzing unit 41 in the relay processing unit 4 and can thereby read an instruction about the operating mode from the optical line terminal 201. The operating mode transition notifying unit 32 passes, for example, information indicating that the operating mode has transitioned from the normal operating mode to the limited operating mode or information indicating vice versa to the traffic control unit 48 in the relay processing unit 4, and can thereby notify the optical line terminal 201 of the transition of the operating mode from the data relay apparatus R. How the received control signal analyzing unit 31 and the operating mode transition notifying unit 32 are used as the function control unit 8 varies between examples of function control which will be described later. Note that the control signal processing unit 3 in the optical network unit in the PON system performs known operation where an instruction is provided to the relay processing unit 4 according to the content of a frame (see, for example, Japanese Unexamined Patent Publication No. 2007-174364).

The data relay apparatus R such as that described above can reduce power consumption by controlling the port-2 receiving unit 1 to change the operating mode to the limited operating mode during a period during which the port 2 does not receive data destined therefor (including data destined for the user network under the control thereof; the same applies to the following). However, when data arrives in the limited operating mode, the arrived data cannot be received and thus is lost. Hence, the port-2 receiving unit 1 should be configured to be placed in the limited operating mode without losing data to be received.

From such a viewpoint, the details of the operation of the function control unit 8 (the operating mode control unit 7 and the control signal processing unit 3) will be described below using specific examples of function control.

<<First Example: Function Control Based on an Instruction and an Automatic Return>>

Figure 5:
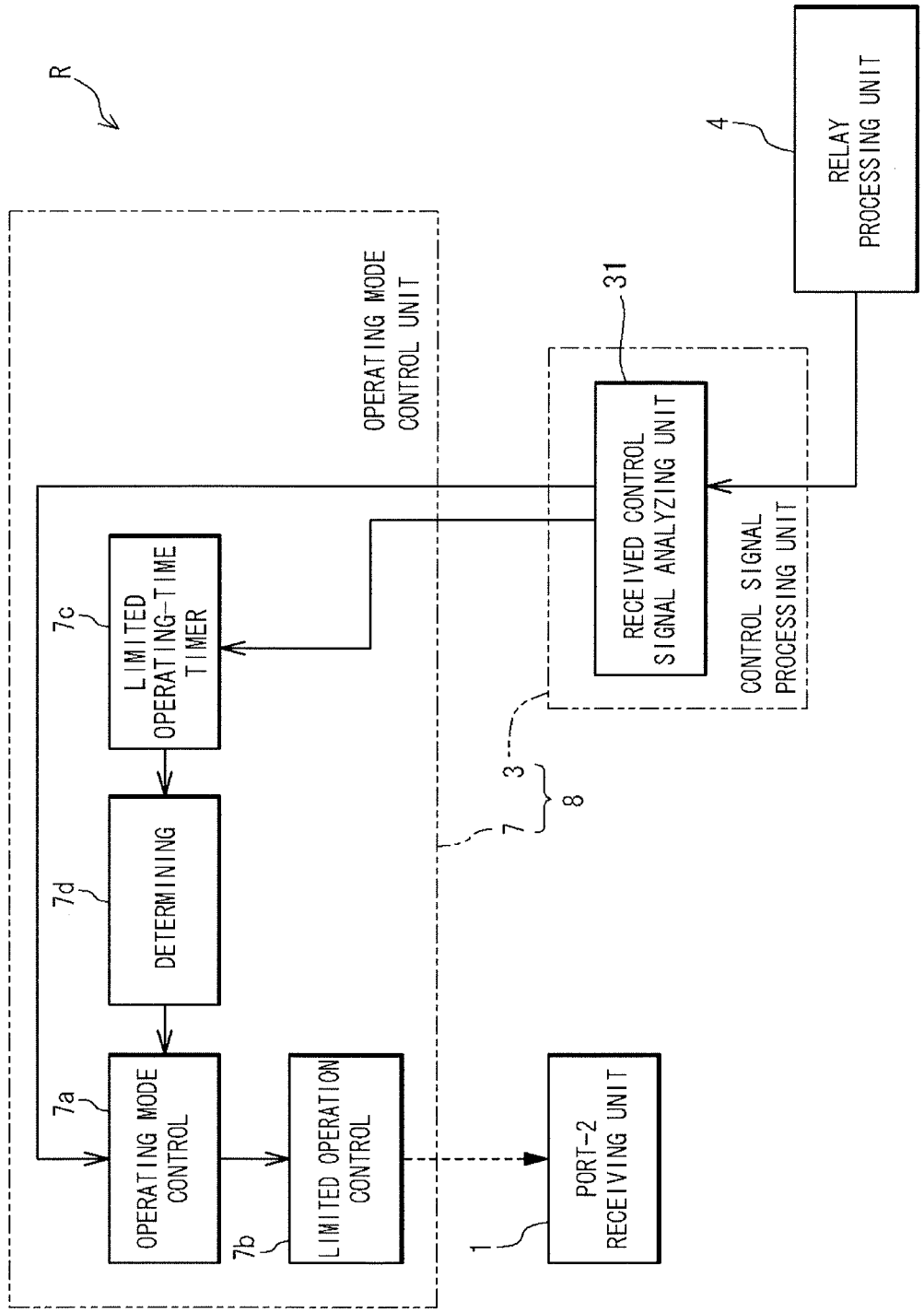
FIG. 5 is a block diagram showing a data relay apparatus that performs function control which is a first example.

FIG. 5 is a block diagram showing a data relay apparatus R (in particular, a function control unit 8) that performs function control which is a first example. In the first example, in response to an "instruction" about the operating mode from the optical line terminal 201 which is a communication partner, the data relay apparatus R passively performs function control. Such an instruction can be included in a control frame transmitted from the optical line terminal 201. The optical line terminal 201 provides an instruction to change the normal operating mode to the limited operating mode, to the data relay apparatus R such that the instruction is included in a control frame.

In FIG. 5, the details of the inside of a port-2 receiving unit 1 and a relay processing unit 4 are as shown in FIGS. 3 and 4. A control frame including an instruction from the optical line terminal 201 is read by a frame analyzing unit 41 in the relay processing unit 4 (FIG. 4), and furthermore, the instruction can be read by a received control signal analyzing unit 31 in a control signal processing unit 3. An operating mode control unit 7 has the functions of operating mode control means 7a, limited operation control means 7b, a limited operating-time timer 7c, and determining means 7d.

In response to the "instruction" about the operating mode from the optical line terminal 201 which is the communication partner, the data relay apparatus R shifts from the normal operating mode to the limited operating mode. However, such passive function control is performed only when shifting from the normal operating mode to the limited operating mode, and a return to the normal operating mode from the limited operating mode is voluntarily performed by timer operation.

Figure 6:
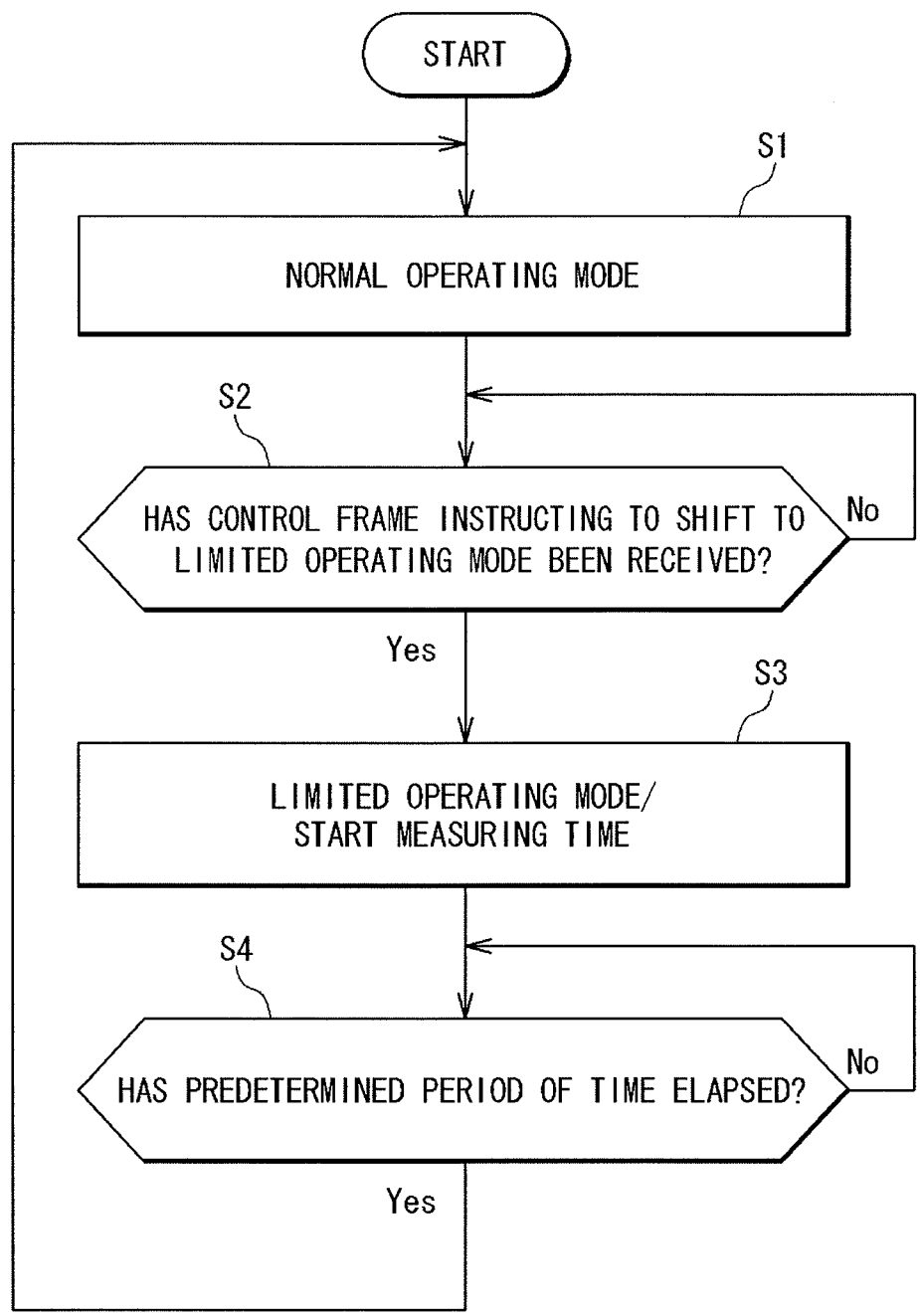
FIG. 6 is a flowchart showing the details of control performed by an operating mode control unit of FIG. 5.

FIG. 6 is a flowchart showing the details of control performed by the operating mode control unit 7. In the drawing, the operating mode control unit 7 first selects the normal operating mode (step S1) and repeatedly determines whether a control frame instructing to shift to the limited operating mode has been received (step S2).

If, in step S2, the operating mode control unit 7 receives a control frame instructing to shift to the limited operating mode, then the operating mode control unit 7 shifts to the limited operating mode and starts measuring time (step S3). In addition, the operating mode control unit 7 determines whether a predetermined period of time (fixed value) has elapsed (step S4). The predetermined period of time is, for example, determined in advance and the optical line terminal 201 is also informed of the predetermined period of time. Note that a specific period of time is, for example, 100 msec or less.

Although the port-2 receiving unit 1 cannot perform reception in the limited operating mode, since the optical line terminal 201 is the one that has issued the instruction in the first place, the optical line terminal 201 recognizes that the port-2 receiving unit 1 is in an unreceivable state. Hence, after issuing the instruction, until at least the predetermined period of time has elapsed, the optical line terminal 201 does not perform transmission to the data relay apparatus R. When downstream data destined for the data relay apparatus R arrives from the upper network, the optical line terminal 201 holds the downstream data in a buffer. In the data relay apparatus R, if the predetermined period of time has elapsed (Yes in step S4), then the operating mode control unit 7 returns to the normal operating mode (step S1).

After this, the same process is repeated.

In this manner, the data relay apparatus R can achieve power savings without failing in data reception.

Note that even if one period of time during which the limited operating mode is selected is short, when it is repeated, a great power saving effect can be obtained. In addition, in a PON system where multiple optical network units are connected to a single optical line terminal, downstream transmission is performed in a time-division manner. Thus, from the viewpoint of each optical network unit, there are many periods during which downstream data destined therefor is not transmitted through an optical fiber. During such periods, by limiting a receive function, power savings can be efficiently achieved.

<<Second Example: Specification of a Period of Time Before Returning>>

Figure 7:
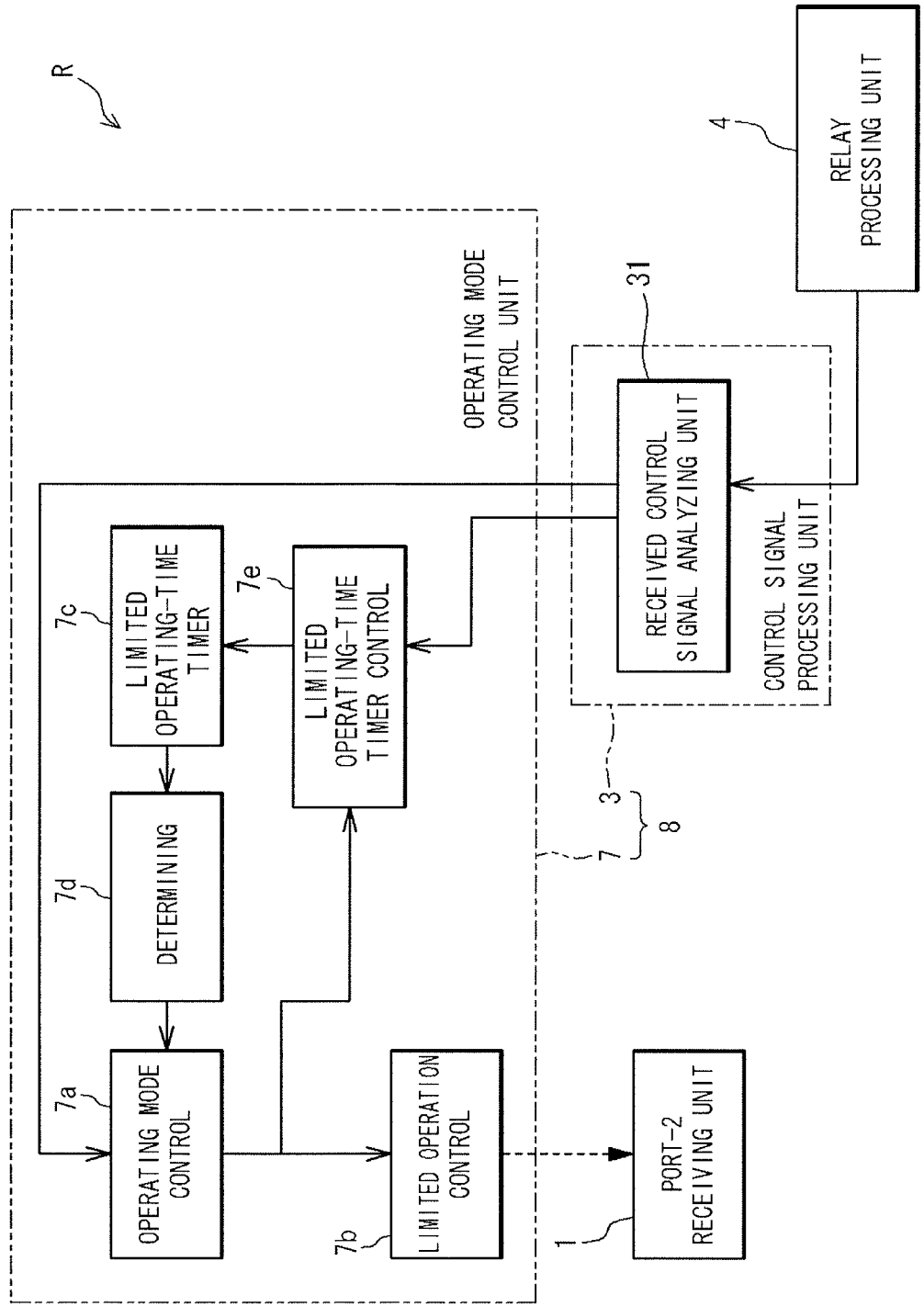
FIG. 7 is a block diagram showing a data relay apparatus that performs function control which is a second example.

FIG. 7 is a block diagram showing a data relay apparatus R (in particular, a function control unit 8) that performs function control which is a second example. In the second example, as in the first example, in response to an "instruction" about the operating mode from the optical line terminal 201 which is a communication partner, the data relay apparatus R shifts from the normal operating mode to the limited operating mode. Note, however, that such passive function control is performed only when shifting from the normal operating mode to the limited operating mode, and a return to the normal operating mode from the limited operating mode is voluntarily performed, as in the first example. However, the second example is different from the first example in that a period of time before returning is specified by the optical line terminal 201 every time.

In FIG. 7, the details of the inside of a port-2 receiving unit 1 and a relay processing unit 4 are as shown in FIGS. 3 and 4. A control frame including an instruction from the optical line terminal 201 is read by a frame analyzing unit 41 in the relay processing unit 4 (FIG. 4), and furthermore, the instruction can be read by a received control signal analyzing unit 31 in a control signal processing unit 3. The instruction includes an instruction to transition to the limited operating mode; and a specified period of time (limited operating-time) during which the limited operating mode should be performed. An operating mode control unit 7 has the function of limited operating-time timer control means 7e that sets a specified period of time (limited operating-time), in addition to the functions of operating mode control means 7a, limited operation control means 7b, a limited operating-time timer 7c, and determining means 7d.

Figure 8:
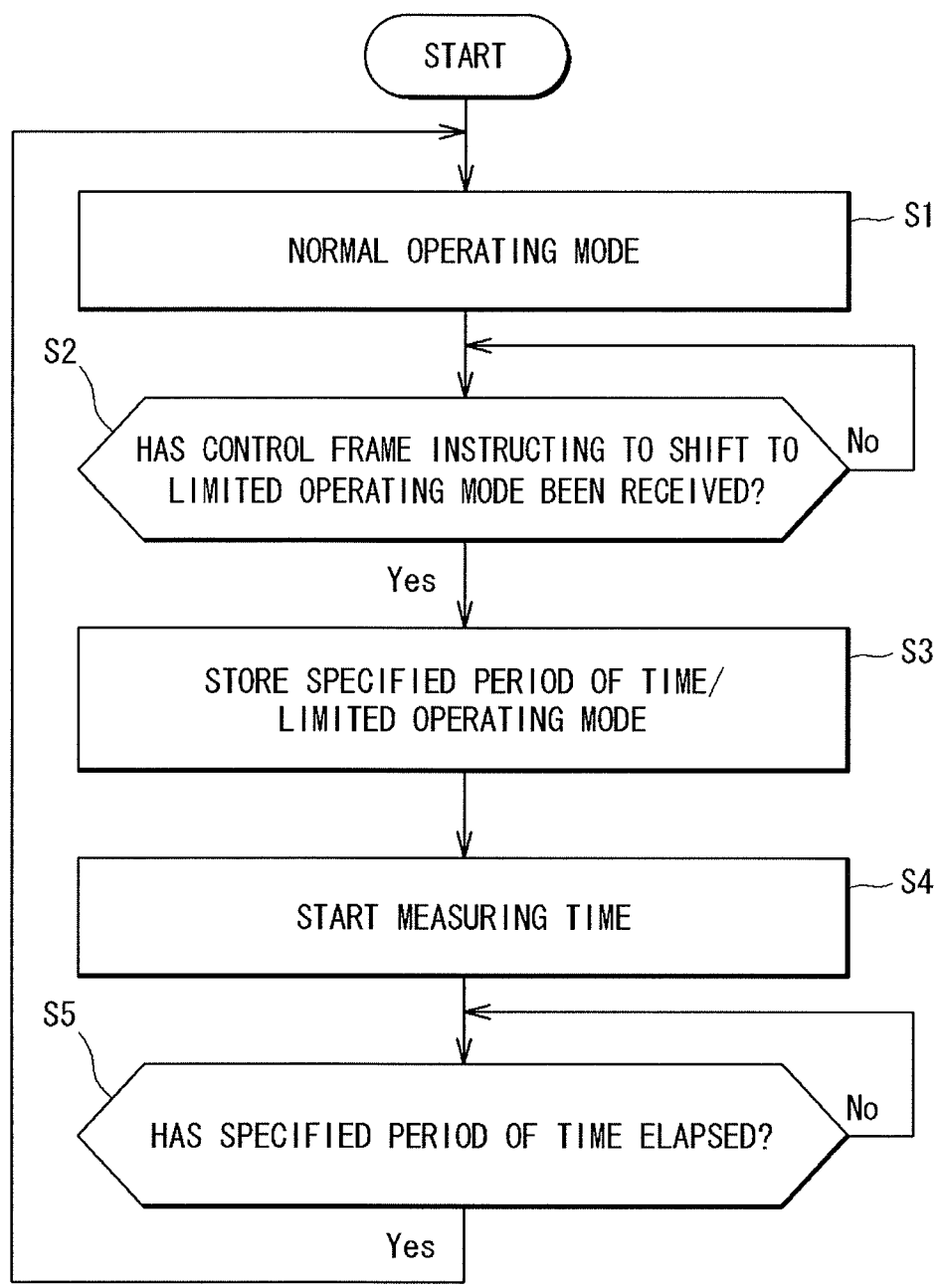
FIG. 8 is a flowchart showing the details of control performed by an operating mode control unit of FIG. 7.

FIG. 8 is a flowchart showing the details of control performed by the operating mode control unit 7. In the drawing, the operating mode control unit 7 first selects the normal operating mode (step S1) and repeatedly determines whether a control frame instructing to shift to the limited operating mode has been received (step S2).

If, in step S2, the operating mode control unit 7 receives a control frame instructing to shift to the limited operating mode, then the operating mode control unit 7 stores a given specified period of time and shifts to the limited operating mode (step S3). In addition, the operating mode control unit 7 starts measuring time (step S4) and determines whether the specified period of time has elapsed (step S5).

Although the port-2 receiving unit 1 cannot perform reception in the limited operating mode, since the optical line terminal 201 is the one that has issued the instruction in the first place, the optical line terminal 201 recognizes that the port-2 receiving unit 1 is in an unreceivable state. Hence, after issuing the instruction, until at least the specified period of time has elapsed, the optical line terminal 201 does not perform transmission to the data relay apparatus R. If the specified period of time has elapsed (Yes in step S5), then the operating mode control unit 7 returns to the normal operating mode (step S1).

After this, the same process is repeated.

In this manner, the data relay apparatus R can achieve power savings without failing in data reception.

According to the second example, in addition to being able to obtain the same functions and effects as those obtained in the first example, a period of time before returning can be specified by the optical line terminal 201. Thus, the length of time during which the receive function is limited can be changed according to the conditions. Furthermore, the optical line terminal 201 accurately grasps a period of time during which the receive function of the data relay apparatus (optical network unit) is limited, and can perform data transmission after a lapse of the predetermined period of time.

Note that a return using a period of time such as that described above is performed based on the event "a lapse of a predetermined period of time"; in addition to this, a return may be performed based on the event "arrival of a predetermined time" (the same applies to other examples and other embodiments which will be described below). In that case, return timing needs to be shared between the optical line terminal 201 and the data relay apparatus R. For example, when the configuration is such that both have a clock and a time shift between the clocks of the two is corrected using time stamp information sent from the optical line terminal 201, by the optical line terminal 201 specifying a time for a return for the data relay apparatus R, the data relay apparatus R returns from the limited operating mode at the time, and the optical line terminal 201 can grasp that the data relay apparatus R returns from the limited operating mode at the time and thus the optical line terminal 201 can resume transmission.

Normally, if nothing is done, a state in which the times indicated by the two clocks always match each other cannot be obtained. However, by repeating a correction to adjust the time indicated by one clock to the time indicated by the other clock periodically or non-periodically, the times indicated by the two clocks can substantially match each other. Note that in a method of measuring a period of time before returning instead of a time, basically, the optical line terminal 201 and the data relay apparatus R only need to measure time using their clocks, and thus, it is not necessary to make adjustments to the clocks. In other words, in terms of that adjustments to the clocks are not necessary, a return using a period of time is easier than a return using a time.

<<Third Example: Notification of a Transition of the Operating Mode>>

Figure 9:
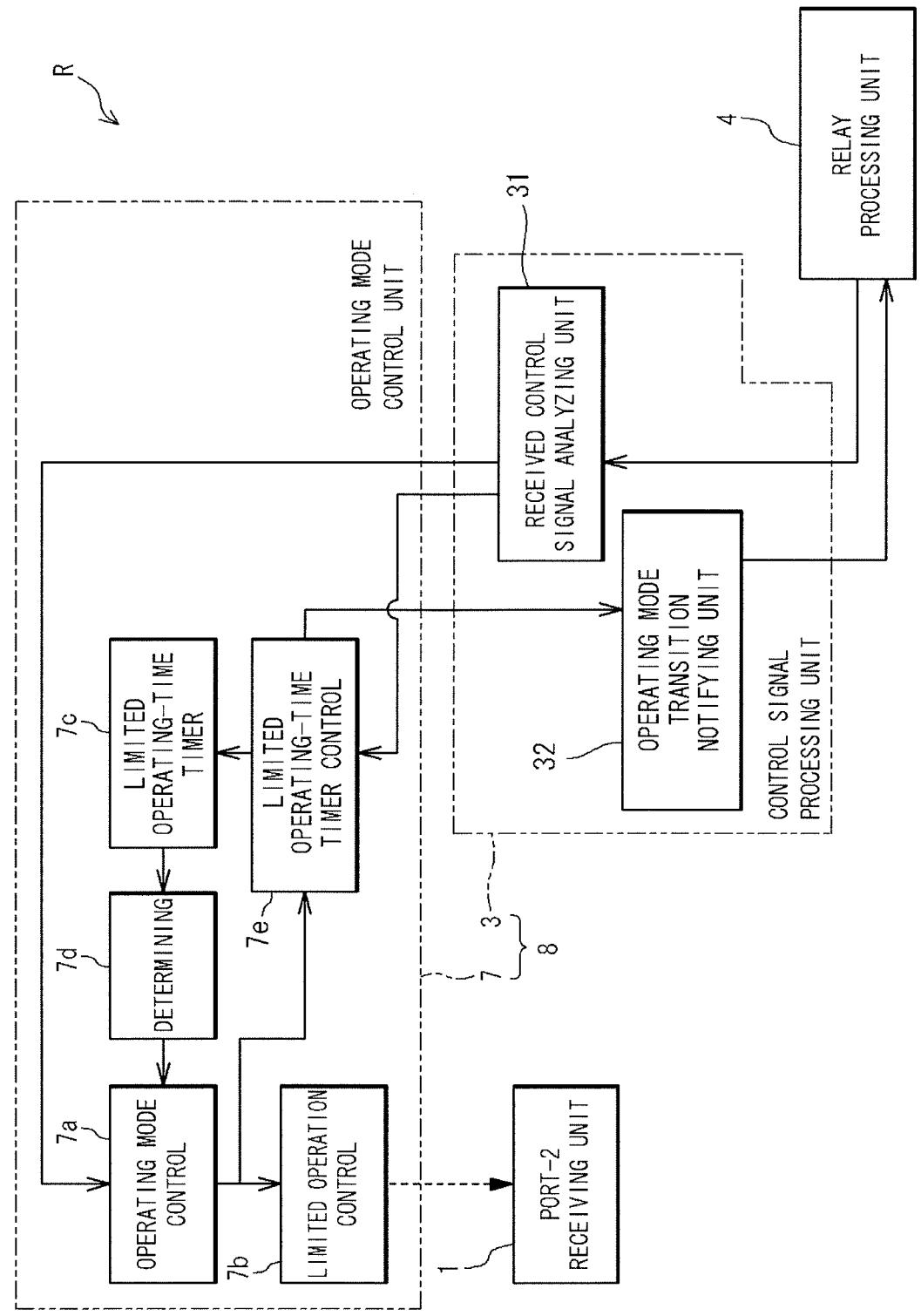
FIG. 9 is a block diagram showing a data relay apparatus that performs function control which is a third example.

FIG. 9 is a block diagram showing a data relay apparatus R (in particular, a function control unit 8) that performs function control which is a third example. The third example is characterized in the provision of the function of notifying the optical line terminal 201 of a transition (shift) of the operating mode. This notification function can also be additionally provided to any of the above-described first and second examples and fourth and fifth examples which will be described later. FIG. 9 shows that the notification function is added to, for example, FIG. 7 (second example), and a transition of the operating mode is notified to an operating mode transition notifying unit 32 in a control signal processing unit 3 by the function of limited operating-time timer control means 7e in an operating mode control unit 7. The operating mode transition notifying unit 32 sends a transition notification to a traffic control unit 48 (FIG. 4) in a relay processing unit 4. The notification can be transmitted to the optical line terminal 201 from the traffic control unit 48.

Figure 10:
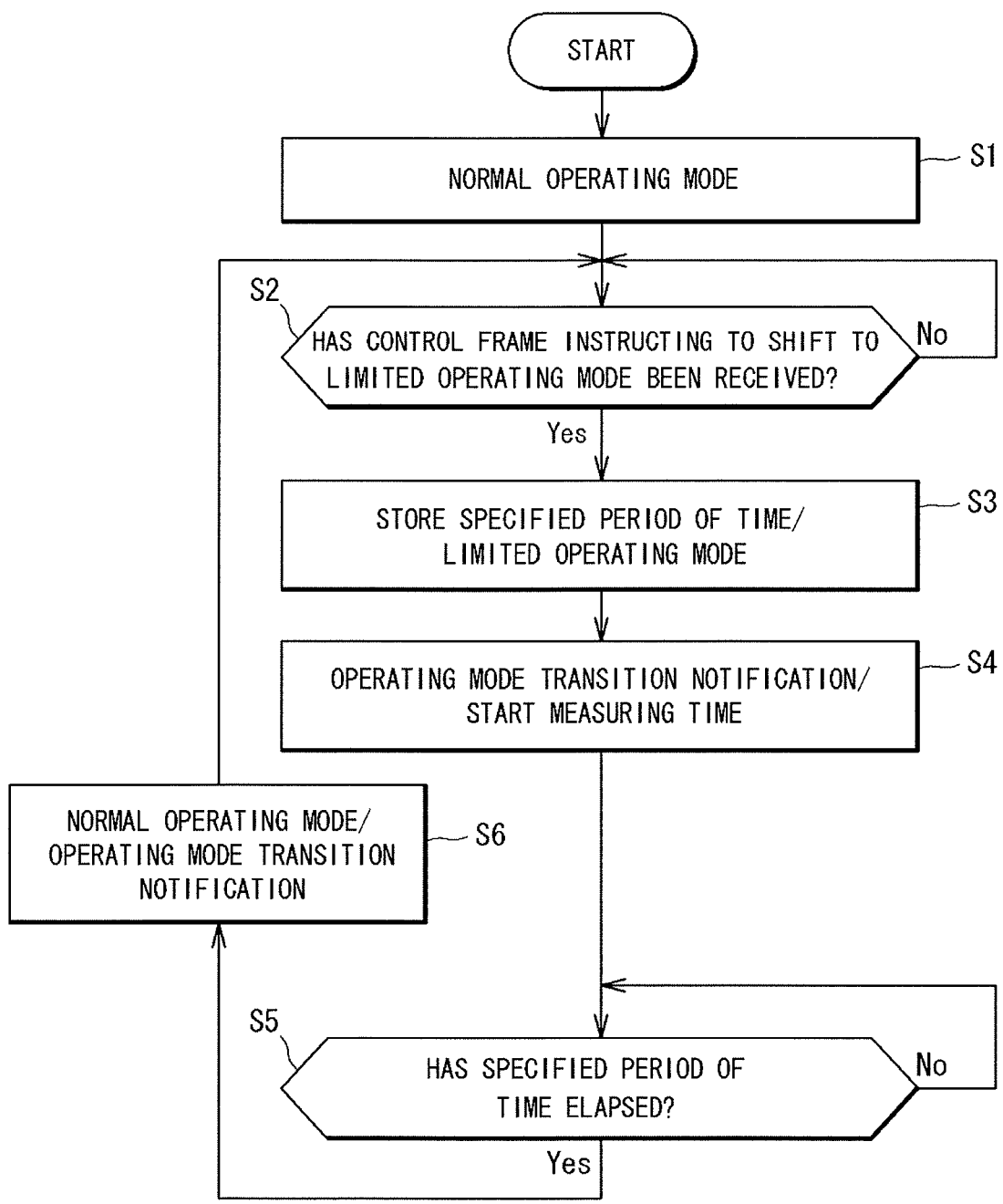
FIG. 10 is a flowchart showing the details of control performed by an operating mode control unit of FIG. 9.

FIG. 10 is a flowchart showing the details of control performed by the operating mode control unit 7. In the drawing, the operating mode control unit 7 first selects the normal operating mode (step S1) and repeatedly determines whether a control frame instructing to shift to the limited operating mode has been received (step S2).

If, in step S2, the operating mode control unit 7 receives a control frame instructing to shift to the limited operating mode, then the operating mode control unit 7 stores a given specified period of time and shifts to the limited operating mode (step S3). Here, the operating mode control unit 7 outputs an operating mode transition notification through the operating mode transition notifying unit 32 and starts measuring time (step S4). Thereafter, the operating mode control unit 7 waits for the specified period of time to elapse (step S5). If the specified period of time has elapsed, then the operating mode control unit 7 returns to the normal operating mode (step S6). At this time, too, an operating mode transition notification from the limited operating mode to the normal operating mode is outputted through the operating mode transition notifying unit 32.

After this, the same process is repeated.

By an operating mode transition notification such as that described above, the data relay apparatus R can develop high-reliability cooperation with the optical line terminal 201 which is a communication partner. For example, when the data relay apparatus R shifts from the normal operating mode to the limited operating mode according to the content (instruction) of a control frame received from the optical line terminal 201, the data relay apparatus R notifies the optical line terminal 201 of the fact that the operating mode has been changed. By this, the optical line terminal 201 can securely know the transition of the operating mode. In addition, when the operating mode of a port-2 receiving unit 1 voluntarily shifts to the limited operating mode independent of an instruction from the optical line terminal 201 (this is fourth and fifth examples which will be described later), too, the optical line terminal 201 can securely know the transition of the operating mode.

Furthermore, when a certain amount of time is required to return to the normal operating mode from the limited operating mode, too, since the optical line terminal 201 can perform transmission to the port 2 after confirming the return, the optical line terminal 201 does not perform data transmission to the port-2 receiving unit 1 being in the state of the limited operating mode, and thus, data loss can be prevented. Therefore, the reliability of data reception improves more.

Note that when, for example, the operating mode control unit 7 in the second example performs an operating mode transition notification, the configuration may be such that an output from operating mode control means 7a (FIG. 7) is led to an operating mode transition notifying unit 32 (not shown in FIG. 7) in the control signal processing unit 3, as in FIG. 9.

<<Fourth Example: Function Control Based on No-Data>>

Figure 11:
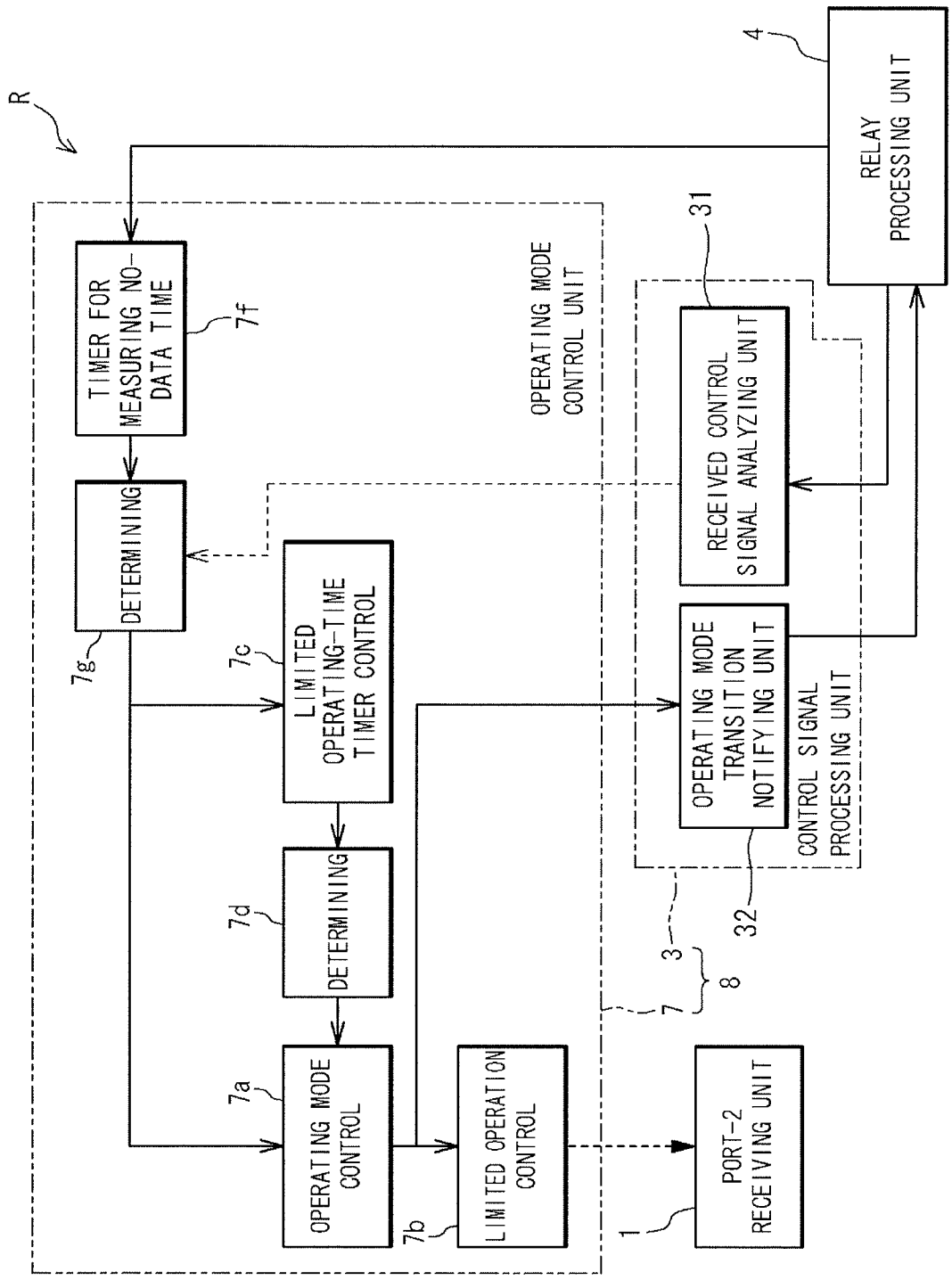
FIG. 11 is a block diagram showing a data relay apparatus that performs function control which is a fourth example.

FIG. 11 is a block diagram showing a data relay apparatus R (in particular, a function control unit 8) that performs function control which is a fourth example. Note that in the fourth example, although the configuration may be such that, for example, the operating mode control unit 7 in the third example (FIG. 9) is used as a base and certain functions are added thereto, for simplification of description, only those portions unique to this example will be described. In this example, the configuration is such that the functions of a timer for measuring no-data time 7f and determining means 7g are provided, and an output from determining means 7g is provided to operating mode control means 7a and a limited operating-time timer 7c. In addition, an operating mode transition notification can be outputted from operating mode control means 7a through an operating mode transition notifying unit 32.

Figure 12:
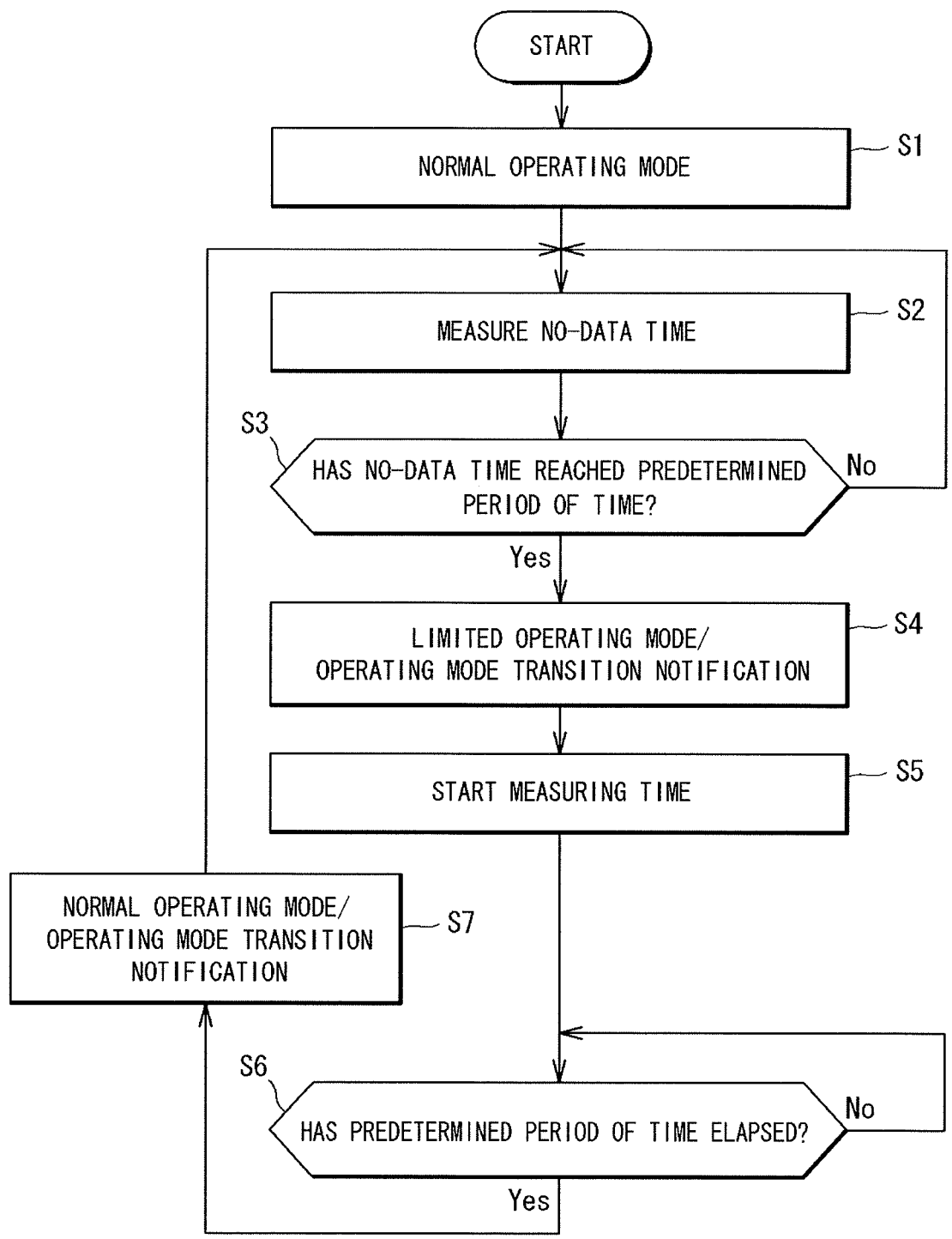
FIG. 12 is a flowchart showing the details of control performed by an operating mode control unit of FIG. 11.

FIG. 12 is a flowchart showing the details of control performed by the operating mode control unit 7. In the drawing, the operating mode control unit 7 first selects the normal operating mode (step S1) and measures no-data time (step S2). The no-data time refers to the time elapsed from the last (immediate) data reception by a port-2 receiving unit 1, without any data destined for the data relay apparatus R coming. Then, the operating mode control unit 7 determines whether the no-data time has reached a predetermined period of time (step S3). If not reached, then the operating mode control unit 7 continues the measurement of no-data time (step S2).

If, in step S3, the no-data time has reached the predetermined period of time, then the operating mode control unit 7 shifts to the limited operating mode and outputs an operating mode transition notification through the operating mode transition notifying unit 32 (step S4). In addition, the operating mode control unit 7 starts measuring time (step S5). Thereafter, the operating mode control unit 7 waits for a predetermined period of time to elapse (step S6). If the predetermined period of time has elapsed, then the operating mode control unit 7 returns to the normal operating mode (step S7). At this time, too, an operating mode transition notification from the limited operating mode to the normal operating mode is outputted through the operating mode transition notifying unit 32.

After this, the same process is repeated.

Note that it is also possible to provide an instruction about the predetermined period of time (step S3) such that the instruction is included in a control signal from the optical line terminal 201. An instruction about the period of time in this case is provided to the operating mode control unit 7 from a received control signal analyzing unit 31, as indicated by a dashed line in FIG. 11.

According to the function control in the fourth example, independent of an instruction from the optical line terminal 201, when there is no data reception for a predetermined period of time, the data relay apparatus R can autonomously achieve power savings. In addition, since an operating mode transition is notified, when the receive function is limited, the optical line terminal 201 can prevent itself from performing data transmission to the data relay apparatus R.

<<Fifth Example: Function Control Based on Data Reception Frequency>>

Figure 13:
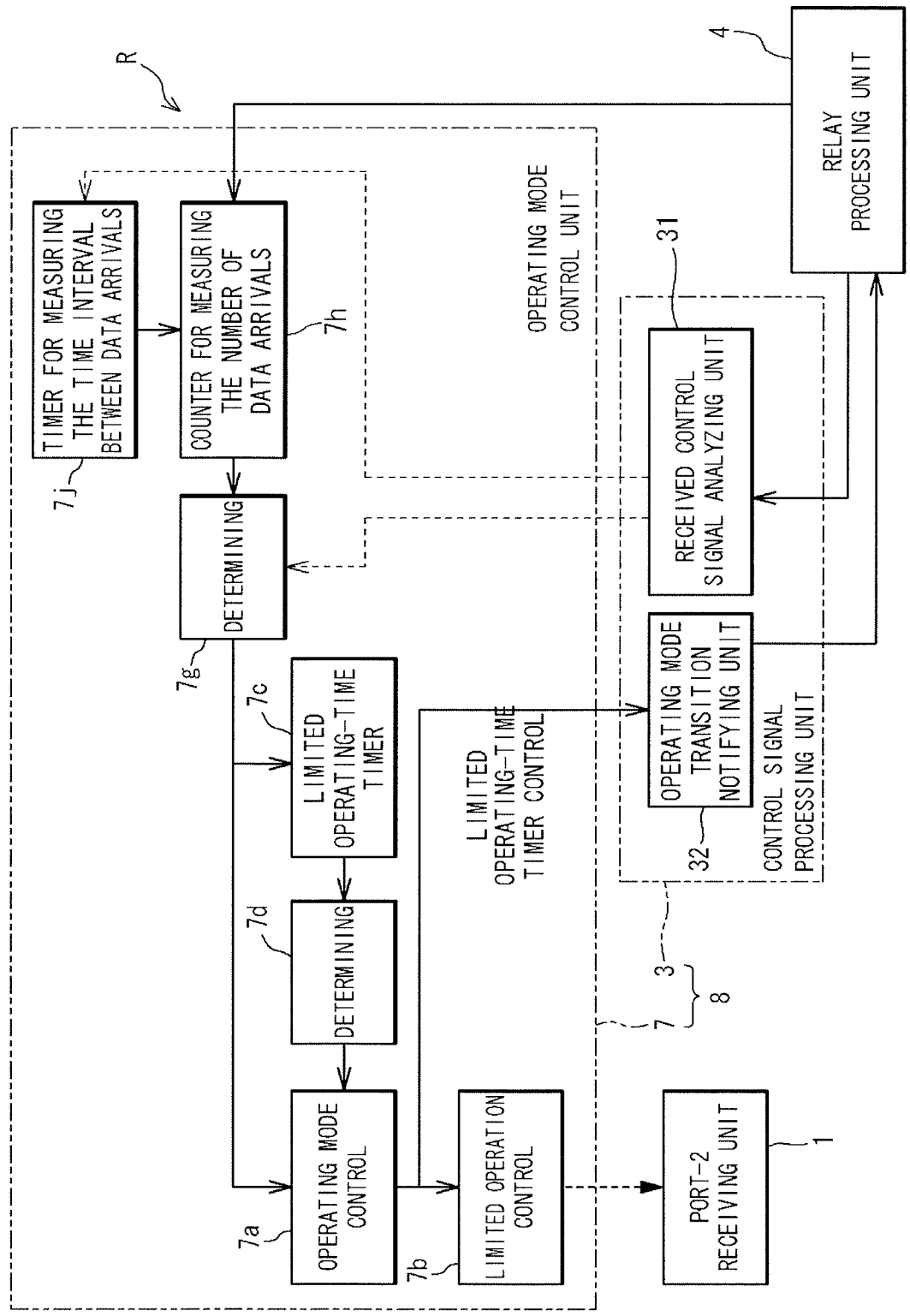
FIG. 13 is a block diagram showing a data relay apparatus that performs function control which is a fifth example.

FIG. 13 is a block diagram showing a data relay apparatus R (in particular, a function control unit 8) that performs function control which is a fifth example. Note that in the fifth example, although the configuration may be such that, for example, the operating mode control unit 7 in the third example (FIG. 9) is used as a base and certain functions are added thereto, for simplification of description, only those portions unique to this example will be described. In this example, the configuration is such that the functions of a counter for measuring the number of data arrivals 7h, a timer for measuring the time interval between data arrivals 7j, and determining means 7g are provided, and an output from determining means 7g is provided to operating mode control means 7a and a limited operating-time timer 7c. In addition, an operating mode transition notification can be outputted from operating mode control means 7a through an operating mode transition notifying unit 32.

Figure 14:
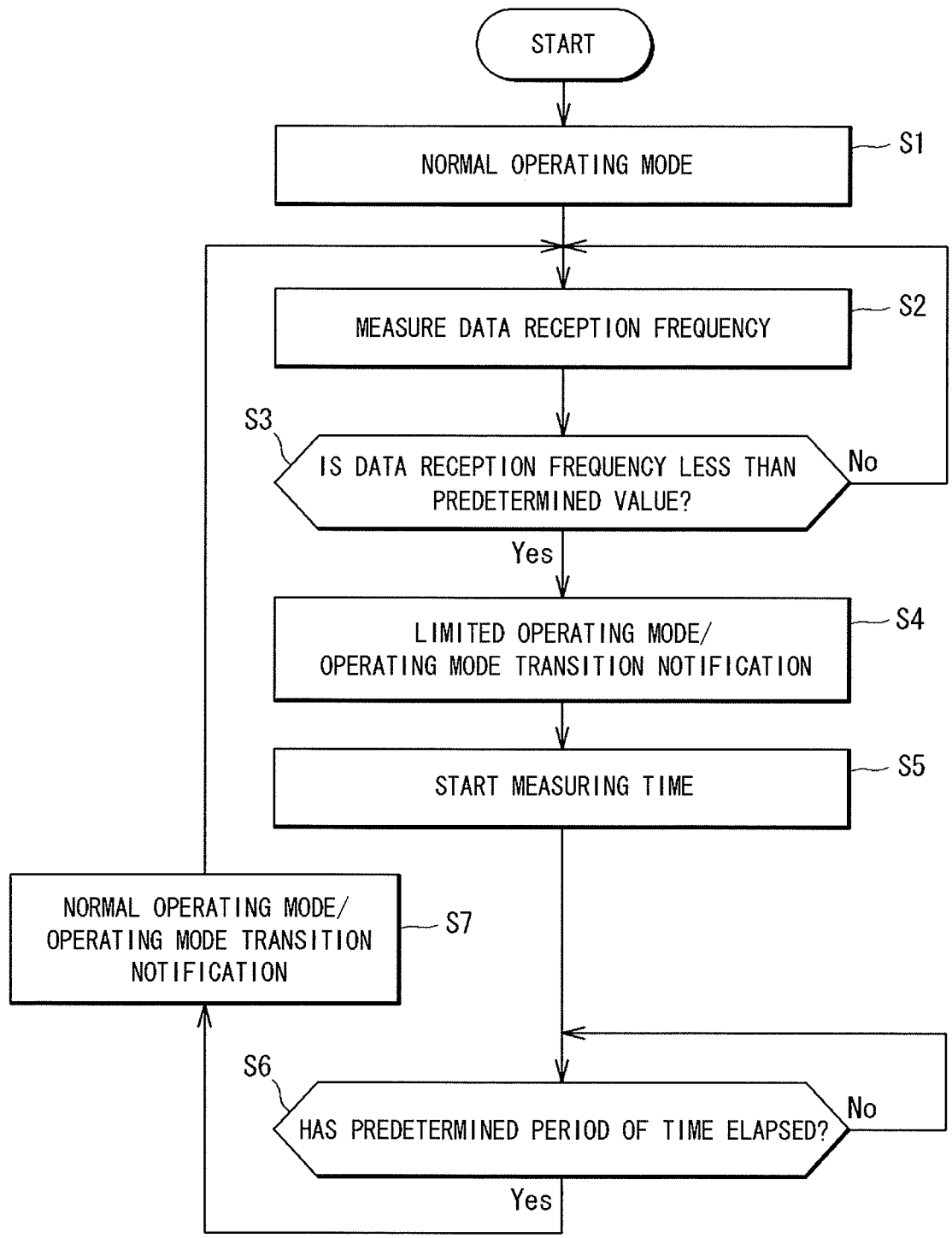
FIG. 14 is a flowchart showing the details of control performed by an operating mode control unit of FIG. 13.

FIG. 14 is a flowchart showing the details of control performed by the above-described operating mode control unit 7. In the drawing, the operating mode control unit 7 first selects the normal operating mode (step S1) and measures data reception frequency (step S2). The data reception frequency refers to the number of data arrivals within a certain period of time, and can be determined by dividing the number of data arrivals which is measured by the counter for measuring the number of data arrivals 7h, by a time interval between data arrivals which is measured by the timer for measuring the time interval between data arrivals 7j. Then, the operating mode control unit 7 determines whether the data reception frequency is less than a predetermined value (step S3). If the data reception frequency is greater than or equal to the predetermined value, then the operating mode control unit 7 continues the measurement of data reception frequency (step S2).

If, in step S3, the data reception frequency is less than the predetermined value, then the operating mode control unit 7 shifts to the limited operating mode and outputs an operating mode transition notification through the operating mode transition notifying unit 32 (step S4). In addition, the operating mode control unit 7 starts measuring time (step S5). Thereafter, the operating mode control unit 7 waits for a predetermined period of time to elapse (step S6). If the predetermined period of time has elapsed, then the operating mode control unit 7 returns to the normal operating mode (step S7). At this time, too, an operating mode transition notification from the limited operating mode to the normal operating mode is outputted through the operating mode transition notifying unit 32.

After this, the same process is repeated.

Note that it is also possible to provide an instruction about the above-described certain period of time for determining data reception frequency and the predetermined value (threshold value) in step S3 such that the instruction is included in a control signal from the optical line terminal 201. An instruction about the period of time in this case is provided to the operating mode control unit 7 from a received control signal analyzing unit 31, as indicated by dashed lines in FIG. 13.

According to the function control in the fifth example, independent of an instruction from the optical line terminal 201, when the data reception frequency is lower than a predetermined value, the data relay apparatus R can autonomously achieve power savings. In addition, since an operating mode transition is notified, when the receive function is limited, the optical line terminal 201 can prevent itself from performing data transmission to the data relay apparatus R.

<<Other Respects Regarding Function Control>>

Note that the function control in the first to fifth examples is illustrative and thus functional portions which are their features may be further combined with each other. Note also that the function control unit 8 may be configured to perform function control that covers all of the illustrated functions in parallel.

Furthermore, variations of function control shown below are considered.

<<Identification of Target Data>>

In the fourth and fifth examples, the "data" which is a measurement target should be only those destined for the data relay apparatus R. Hence, only when transferring a data frame to the side of the buffer managing unit 42 of FIG. 4, in other words, only for those frames relayed to another port which is different than a port to which data is inputted, the frame analyzing unit 41 may update the timer for measuring no-data time 7f (FIG. 11) or the counter for measuring the number of data arrivals 7h (FIG. 13).

A determination as to whether an inputted data frame is relayed to another port is made based on, for example, destination address information of the frame, type information of the frame, VLAN tag information, etc. For example, when a control frame to be transferred to the control signal processing unit 3 is received, the timer for measuring no-data time 7f or the counter for measuring the number of data arrivals 7h is not updated. Alternatively, in the case of an optical network unit in the PON system, when a frame destined for another optical network unit arrives at a port-2 receiving unit 1, a timer for measuring no-data time 7f or a counter for measuring the number of data arrivals 7h is not updated. In this manner, even in a state in which data that does not need to be relayed frequently arrives at the port, the data relay apparatus R can shift to the limited operating mode according to whether there is user data to be relayed essentially or the frequency of user data arrival.

<<Advance Notice of a Period of Time Before Returning>>

Regarding a return to the normal operating mode from the limited operating mode, advance notice of a period of time before returning may be provided. For example, when the data relay apparatus R autonomously shifts from the normal operating mode to the limited operating mode independent of an instruction from the optical line terminal 201, a period of time before returning to the normal operating mode which is scheduled from the set value of the limited operating-time timer 7c is notified to the optical line terminal 201 in advance. By this, the optical line terminal 201 can know the scheduled timing of a return to the normal operating mode.

In addition, when the operating mode shifts to the limited operating mode by an instruction from the optical line terminal 201, by notifying the optical line terminal 201 of such a fact, the optical line terminal 201 can confirm that the instruction has been accepted. Alternatively, when the data relay apparatus R wants to stay in the limited operating mode over a period that differs from a period of time specified by the optical line terminal 201, too, by providing advance notice of a period of time before returning, the "intention", so to speak, of the data relay apparatus R can be notified to the optical line terminal 201 in advance. In this case, after returning, without the need for the data relay apparatus R to notify the optical line terminal 201 of the fact of the return, the optical line terminal 201 can grasp beforehand the timing at which the optical line terminal 201 is allowed to perform transmission to the data relay apparatus R.

Note that it is also possible to provide advance notice of a time for a return instead of a period of time before returning.

<<Postpone Time Before Limiting the Function>>

When data arrives in the limited operating mode, the data ends up reception failure and thus such an event should be avoided.

To avoid such an event, when the data relay apparatus R performs control to limit the function itself instead of by an instruction from the optical line terminal 201, the data relay apparatus R postpones an actual limitation in function during a period of time required from when a notification indicating the limitation reaches the optical line terminal 201 until data having already been transmitted immediately before the optical line terminal 201 recognizes the notification and stops transmission to the data relay apparatus R reaches the data relay apparatus R.

In this case, the data relay apparatus R waits to limit the function until a notification reaches the optical line terminal 201 and already transmitted data reaches the data relay apparatus R. Thus, the data relay apparatus R can securely receive data having already been transmitted thereto from the optical line terminal 201 right before limiting the function. In this manner, the data relay apparatus R can develop high-reliability cooperation with the communication partner.

In addition, in a configuration which is a bit different from that described above, it is also possible that when the data relay apparatus R performs control to limit the function itself instead of by an instruction from the optical line terminal 201, the data relay apparatus R postpones an actual limitation in function during a period of time from when a notification indicating the limitation reaches the optical line terminal 201 and is recognized by by the optical line terminal 201 until a notification indicating the recognition of the limitation in function reaches the data relay apparatus R from the optical line terminal 201.

In this case, the data relay apparatus R waits to limit the function until a notification reaches the optical line terminal 201 and a notification indicating acknowledgement of the notification reaches the data relay apparatus R. Thus, the data relay apparatus R can securely receive data having already been transmitted thereto from the optical line terminal 201 before limiting the function. In this manner, the data relay apparatus R can develop high-reliability cooperation with the communication partner.

{Second Embodiment}

Next, a second embodiment of the present invention will be described. The second embodiment differs from the first embodiment in a target part for a limitation in function in a data relay apparatus R.

Figure 15:
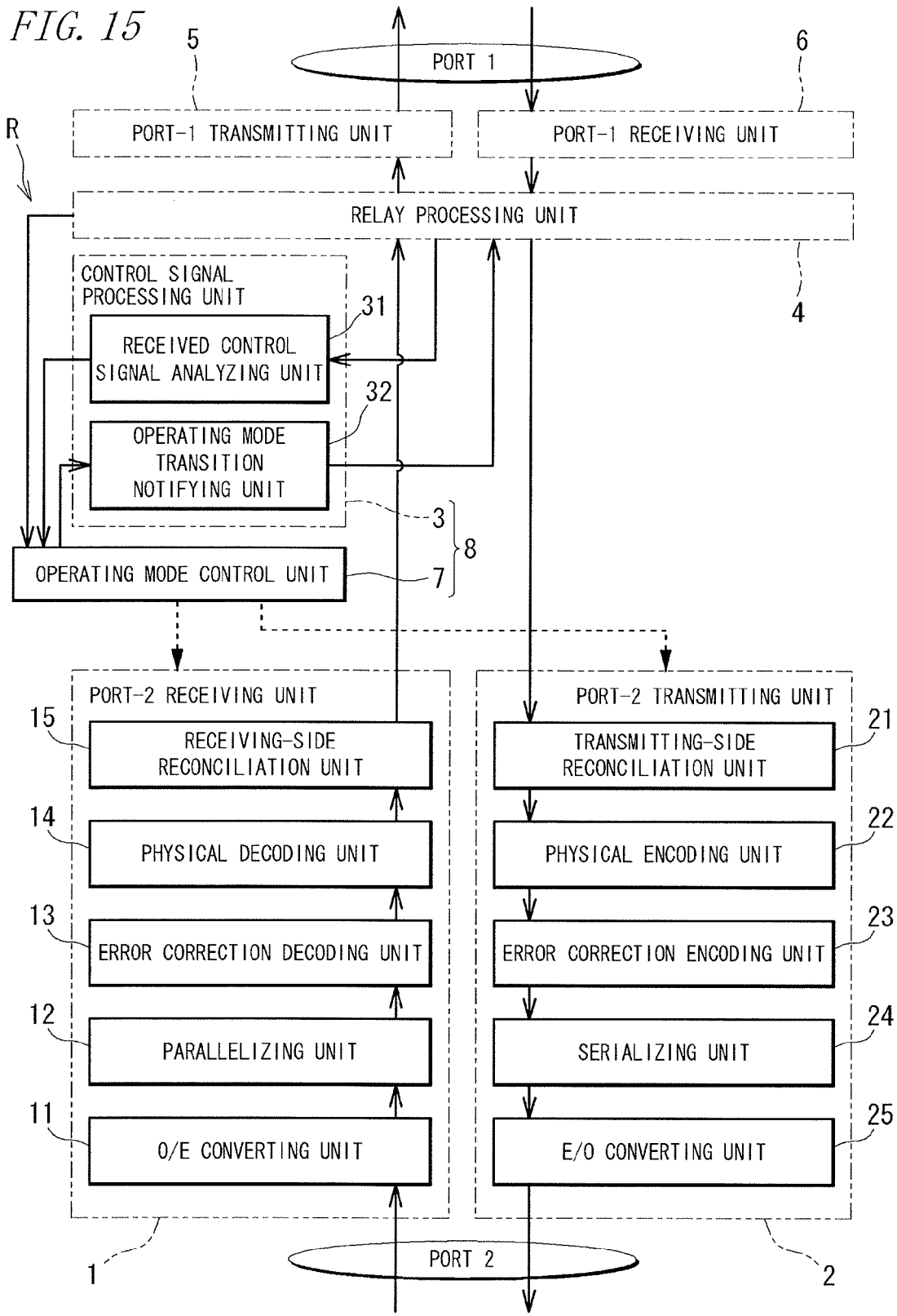
FIG. 15 is a block diagram (1/2) showing the configuration of the data relay apparatus according to the second embodiment.
Figure 16:
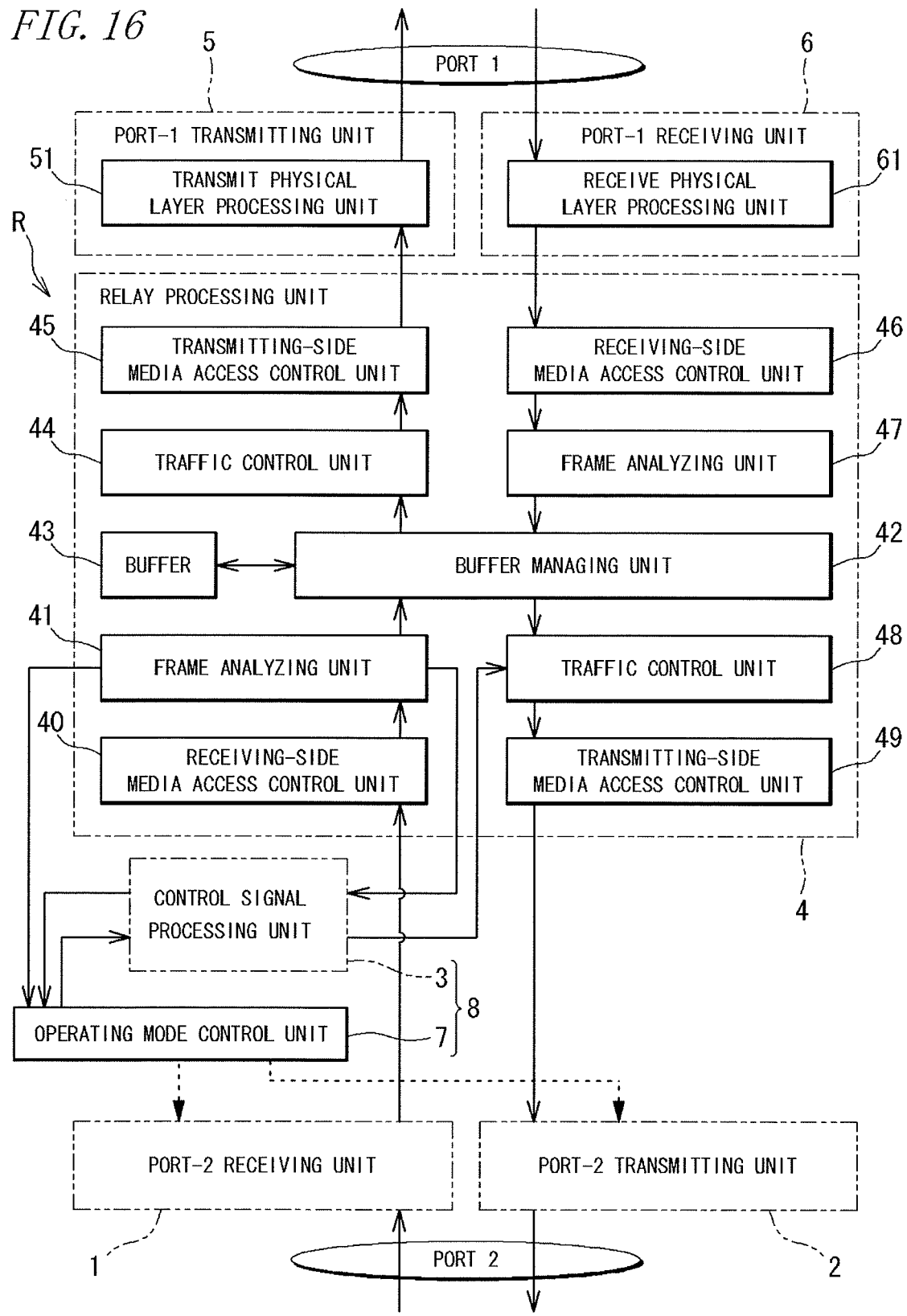
FIG. 16 is a block diagram (2/2) showing the configuration of the data relay apparatus according to the second embodiment.

FIGS. 15 and 16 are diagrams having the same representation as that in FIGS. 3 and 4 in the first embodiment, and are block diagrams showing a configuration of a data relay apparatus R according to the second embodiment. The difference from FIGS. 3 and 4 is that control of a limitation in function performed by an operating mode control unit 7 (indicated by dashed lines) is performed not only on a port-2 receiving unit 1 but also on a port-2 transmitting unit 2.

As in FIGS. 3 and 4, the port-2 transmitting unit 2 includes: a transmitting-side reconciliation unit 21 that performs reconciliation with a transmitting-side media access control unit 49; a physical encoding unit 22 that encodes a signal; an error correction encoding unit 23 that encodes forward error correction; a serializing unit 24 that converts an electrical signal into a serial signal; and an E/O converting unit 25 that performs waveform shaping and drives an E/O conversion device in addition to E/O conversion (conversion from an electrical signal to an optical signal). The port-2 transmitting unit 2 configured by these units (21 to 25) can be used in two modes: a normal operating mode in which the port-2 transmitting unit 2 exerts 100% of its function and a limited operating mode in which the function is limited. Mode selection is performed by a function control unit 8 configured by the operating mode control unit 7 and a control signal processing unit 3.

Function control performed on the port-2 transmitting unit 2 is performed in the same manner as function control performed on the port-2 receiving unit 1, and a shift from the normal operating mode to the limited operating mode and a return to the normal operating mode from the limited operating mode are performed. By this, there are more parts that achieve power savings and thus further power savings can be achieved over the first embodiment (FIGS. 3 and 4).

Note that when the port-2 transmitting unit 2 is in the limited operating mode and there is transmit data in an upstream direction, the data in the upstream direction is stored in a buffer 43 in a relay processing unit 4 until the port-2 transmitting unit 2 returns to the normal operating mode.

{Third Embodiment}

Next, a third embodiment of the present invention will be described. The third embodiment differs from the first embodiment in a target part for a limitation in function in a data relay apparatus R.

Figure 17:
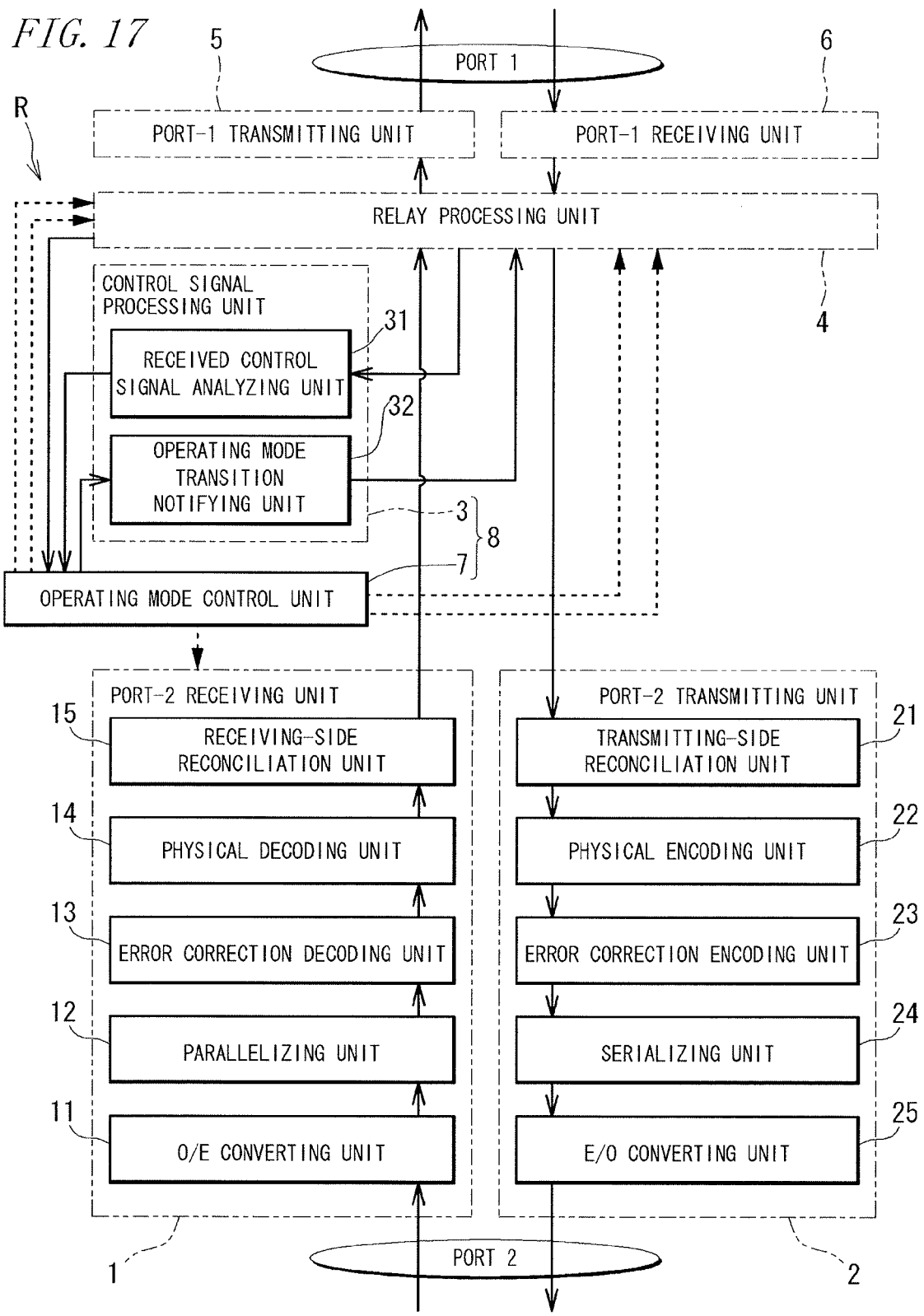
FIG. 17 is a block diagram (1/2) showing the configuration of the data relay apparatus according to the third embodiment.
Figure 18:
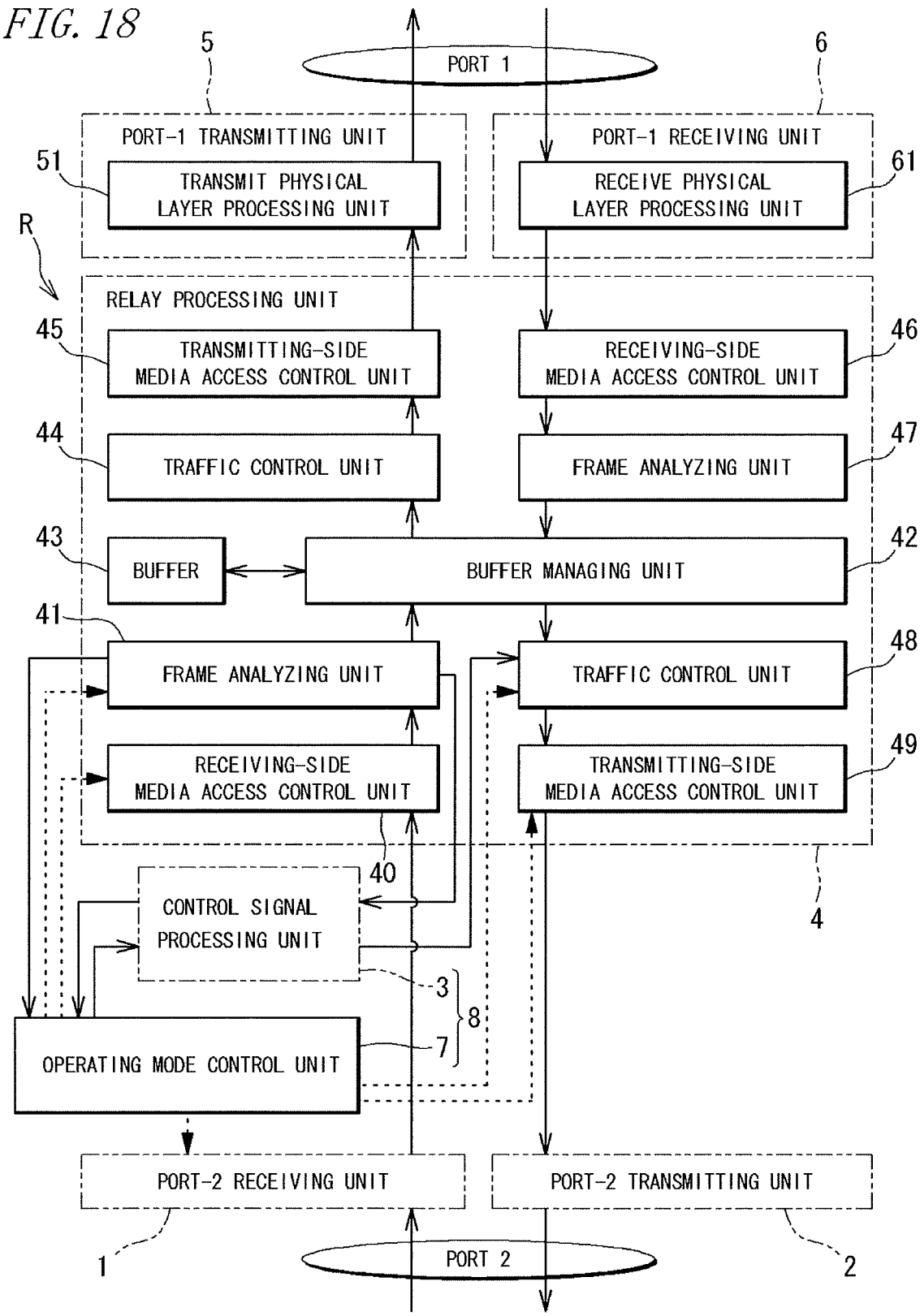
FIG. 18 is a block diagram (2/2) showing the configuration of the data relay apparatus according to the third embodiment.

FIGS. 17 and 18 are diagrams having the same representation as that in FIGS. 3 and 4 in the first embodiment, and are block diagrams showing a configuration of a data relay apparatus R according to the third embodiment. The difference from FIGS. 3 and 4 is that control of a limitation in function performed by an operating mode control unit 7 (indicated by dashed lines) is performed not only on a port-2 receiving unit 1 but also on a relay processing unit 4.

Although the internal configuration of the relay processing unit 4 is the same as that in FIG. 4, a part thereof, i.e., a receiving-side media access control unit 40 and a frame analyzing unit 41 in a downstream direction and a traffic control unit 48 and a transmitting-side media access control unit 49 in an upstream direction, can be used in two modes: a normal operating mode in which they exert 100% of their functions and a limited operating mode in which the functions are limited. Mode selection is performed by a function control unit 8 configured by the operating mode control unit 7 and a control signal processing unit 3.

Function control performed on the relay processing unit 4 is performed in the same manner as function control performed on the port-2 receiving unit 1, and a shift from the normal operating mode to the limited operating mode and a return to the normal operating mode from the limited operating mode are performed. By this, there are more parts that achieve power savings and thus further power savings can be achieved over the first embodiment (FIGS. 3 and 4).

Note that when the relay processing unit 4 is in the limited operating mode and there is transmit data in the upstream direction, the data in the upstream direction is stored in a buffer 43 until the relay processing unit 4 returns to the normal operating mode.

In addition, in the third embodiment, function control performed on a port-2 transmitting unit 2 which is the same as that in the second embodiment may also be performed at the same time. The data relay apparatus in this case is particularly excellent in power-saving effect.

{Others}

Note that for a limitation in the function of the port-2 receiving unit 1 or the port-2 transmitting unit 2, in addition to limiting the whole function of each unit at once, the function can also be selectively limited for each internal circuit. For example, it is possible that a plurality of stepwise limited operating modes are prepared, and circuits that perform limited operation in each limited operating mode are determined in advance according to the application, circuit startup time, etc.

Specifically, it is considered to provide limited operating modes according to the circuit startup time. For example, a circuit that requires a short time to stably operate upon a start is considered as a target for limited operating mode 1. In addition to the target circuit for limited operating mode 1, a circuit that requires a long time to stably operate is considered as a target for limited operating mode 2. Then, the limited operating modes are switched according to the frequency of data arrival, a time of day, user's intention, etc.

For example, in FIGS. 3 and 4, the O/E converting unit 11 performs, as described above, amplification, quantization, and timing extraction in addition to O/E conversion. The E/O converting unit 25 performs waveform shaping and drive in addition to E/O conversion. Here, for example, a bias voltage control circuit for the APD in the case of using an avalanche photodiode (APD) for O/E conversion, a clock and data recovery circuit (timing extraction), and a laser diode (LD) control circuit included in a driver circuit that drives an LD in the E/O converting unit 25 have a relatively long startup time. In particular, when APD bias voltage control and LD control are performed using a microcontroller, there is a tendency that the circuit startup time is long. In addition, when a phase-locked loop (PLL) circuit is included in the clock and data recovery circuit, there is a tendency that the time before the loop is stabilized is long.

Once these circuits with a long startup time shift to the limited operating mode, a startup time before the circuits return to the normal operation is long. Hence, there is a possibility that the optical line terminal 201 may not be able to wait until the timing at which data loss does not occur, after attempting to transmit data to a port of the data relay apparatus being in a state of the above-described limited operating mode 2. In view of this, at the risk of such data loss, the circuits can be shifted to limited operating mode 2 based on the intention of a user of the apparatus, the circuits can be shifted to limited operating mode 2 only during, for example, nighttime hours when the user does not use the apparatus, or the circuits can be shifted to limited operating mode 2 only during hours when the frequency of data arrival is low.

In addition, it is also possible that, for example, a plurality of limited operating modes are prepared in connection with a period of time (startup time) required to return to the normal operating mode from the limited operating mode, and circuits that shift to limited operation in their limited operating modes are determined in advance based on the startup times of the respective circuits. In this case, the data relay apparatus selects one of the plurality of limited operating modes according to the time during which the limited operating mode should be performed, and then goes into the limited operating mode.

For example, there are provided limited operating mode 1 in which the startup time is 1 millisecond or less and limited operating mode 2 in which the startup time is 10 milliseconds or less. Then, in limited operating mode 2, all circuits including the bias voltage control circuit for the APD, the clock and data recovery circuit, and the LD control circuit are allowed to perform limited operation. In limited operating mode 1, all circuits other than the bias voltage control circuit for the APD, the clock and data recovery circuit, and the LD control circuit are allowed to perform limited operation. The operating modes are determined in this manner in advance. Then, when 10-millisecond limited operation is specified by the optical line terminal, the operating mode shifts to limited operating mode 1. When 100-millisecond limited operation is specified by the optical line terminal, the operating mode shifts to limited operating mode 2. A threshold value to determine which one of limited operating mode 1 and 2 to select is determined in advance. For example, when limited operation with less than 30 milliseconds is specified, limited operating mode 1 is performed. When limited operation with 30 milliseconds or more is specified, limited operating mode 2 is selected.

For another way to select a mode, for example, a circuit pertaining to transmission is considered as a target for limited operating mode 1. On the other hand, in addition to the target circuit for limited operating mode 1, a circuit pertaining to reception is considered as a target for limited operating mode 2. Then, the limited operating modes may be switched according to the application used by the user of the apparatus. It is also possible that when the user is using a telephone or videophone, operation is performed in the normal operating mode. When the user is watching a television program, the operating mode shifts to limited operating mode 1 to allow a circuit pertaining to transmission to perform limited operation. When the user is browsing the Internet using a web browser, etc., or when the user is not using, the operating mode shifts to limited operating mode 2 to allow circuits pertaining to transmission and reception to perform limited operation.

By such a configuration, the limited operating mode (a mode of limiting the function) can be minutely set according to the application. In addition, an appropriate selection can be made, taking also into account a startup time required for a return for each part.

In addition, it is also possible to configure a data relay apparatus that selects one of a plurality of limited operating modes according to the type of data transmitted and then goes into the limited operating mode. In this case, a plurality of limited operating modes are prepared in connection with the type of data to be transmitted, and circuits that shift to limited operation in their limited operating modes are determined in advance, taking into account the attribute of data to be transmitted.

For example, there are provided limited operating mode 1 for the case in which telephone audio data is not transmitted and video data of a television broadcast is transmitted, and limited operating mode 2 for the case in which both audio and video data are not transmitted. Then, it is determined that in limited operating mode 1*a* transmitting-side circuit is allowed to perform limited operation, and in limited operating mode 2 both transmitting- and receiving-side circuits are allowed to perform limited operation. The content of a data frame transmitted is analyzed. Then, if audio data is not transmitted, then the operating mode shifts to limited operating mode 1. If neither audio data nor video data is transmitted, then the operating mode shifts to limited operating mode 2.

Note that a criterion for identifying audio and video data is predetermined, and data type is determined based on information such as the destination address of a frame, the type of the frame, and the VLAN-ID and priority of a VLAN tag. For example, a frame in which the destination MAC address is a unicast address and the VLAN tag priority is 7 can be determined to be telephone audio data. A frame in which the destination MAC address is a multicast address and the VLAN tag priority is 5 can be determined to be television broadcast video data.

In addition, it is also possible that a plurality of limited operating modes are provided and circuits whose operation is limited in their limited operating modes are more minutely set.

For a next transition destination and a transition condition upon transition of the operating mode, a method is considered in which a state machine that defines state transitions between operating modes is embedded in advance in a relay apparatus.

In addition, a method is also considered in which an operating mode transition destination is specified one by one by a communication partner apparatus upon transition. Furthermore, a method using the above-described two methods is also considered.

For example, as shown in a table of Table 1, which circuit is turned on (normal operating mode) or off (limited operating mode) in which limited operating mode may be set and control may be performed according to the contents of the table. It is also considered that this table is set by a communication partner such as an optical line terminal.

TABLE 1

| | Target circuit | | | | | | | |
|---|---|---|---|---|---|---|---|---|
| Operating mode | O/E conversion | Amplification | Quantization | Timing extraction | Parallelization | Decoding | ... | E/O conversion |
| Limited operating mode 1 | ON | ON | ON | ON | ON | ON | | OFF |
| Limited operating mode 2 | ON | OFF | OFF | ON | OFF | OFF | | OFF |
| ... | | | | | | | | |
| Limited operating mode N | OFF | OFF | OFF | OFF | OFF | OFF | OFF | OFF |

Note that a data relay apparatus that achieves power savings by limiting the receive function, etc., and shares the fact of the limitation with a communication partner can also be applied as an L2 switch, etc., or a relay apparatus in a router, in addition to an FTTH-related apparatus.

Note also that although in the above-described embodiments the condition for the receive function, etc., to return to the normal operating mode from the limited operating mode is a lapse of a predetermined period of time or arrival of a predetermined time, the return condition is not necessarily limited thereto.

Finally, the embodiments disclosed herein are to be considered in all respects as illustrative and not restrictive. The scope of the present invention is indicated by the appended claims and is intended to include all changes which come within the meanings and range of equivalency of the claims.

REFERENCE SIGNS LIST

1: PORT-2 RECEIVING UNIT
2: PORT-2 TRANSMITTING UNIT
4: RELAY PROCESSING UNIT
5: PORT-1 TRANSMITTING UNIT
6: PORT-1 RECEIVING UNIT
8: FUNCTION CONTROL UNIT
201: OPTICAL LINE TERMINAL
202 to 204: OPTICAL NETWORK UNIT
205 and 207 to 209: OPTICAL FIBER
R: DATA RELAY APPARATUS

The invention claimed is:

1. A data relay apparatus that performs data transfer from one port to another port, the data relay apparatus comprising: a transmitting unit and a receiving unit provided for each port; a relay processing unit provided between the receiving unit at the one port and the transmitting unit at another port, and performing a data transfer relay process; and a function control unit that performs function control to limit a receive function of the receiving unit at the one port to reduce power consumption and thereafter allow the receive function to recover when a predetermined recovery condition is satisfied, the function control unit performing the function control based on an instruction when the instruction to perform the function control is received from a communication partner connected to the one port, whereas the function control unit notifies information about the function control to the communication partner when the data relay apparatus performs the function control itself independent of the instruction wherein in addition to the function control targeted for the receiving unit, the function control unit performs function control to limit a transmit function of the transmitting unit at a same port as the receiving unit to reduce power consumption, and to allow the transmit function to recover when the recovery condition is satisfied, wherein the function control unit measures a frequency of receiving data from the communication partner and performs the function control to limit a function when the measured frequency is less than or equal to a predetermined value.

2. The data relay apparatus according to claim 1, wherein in addition to the function control targeted for the receiving unit, the function control unit performs function control to limit a partial function of the relay processing unit to reduce power consumption, and to allow the partial function to recover when the recovery condition is satisfied.

3. The data relay apparatus according to claim 1, wherein the predetermined recovery condition includes any of following:
(a) a lapse of a predetermined period of time; and
(b) arrival of a predetermined time.

4. The data relay apparatus according to claim 3, wherein the function control unit sets the predetermined period of time or the predetermined time itself.

5. The data relay apparatus according to claim 3, wherein the function control unit sets a period of time or a time instructed by the communication partner, as the predetermined period of time or the predetermined time.

6. The data relay apparatus according to claim 3, wherein when the function control to limit a function is performed, a period of time before allowing the function to recover or a time at which the function recovers is notified to the communication partner.

7. The data relay apparatus according to claim 1, wherein a current state of a function serving as a target for the function control performed by the function control unit is notified to the communication partner.

8. The data relay apparatus according to claim 1, wherein the function control unit measures a period of time elapsed from when last data is received from the communication partner, and performs the function control to limit a function when the measured period of time has reached a predetermined period of time.

9. The data relay apparatus according to claim 8, wherein only when data is relayed from the one port to another port, the function control unit considers as data reception.

10. The data relay apparatus according to claim 1, wherein a plurality of modes are defined in advance for a mode of limiting a function, and the function control unit selects any of the modes.

11. The data relay apparatus according to claim 10, wherein a plurality of limited operating modes are prepared in connection with a period of time required to return to a normal operating mode from a limited operating mode where a function is limited, and circuits that shift to limited operation in their limited operating modes are determined in advance based on startup times of the respective circuits.

12. The data relay apparatus according to claim 1, wherein the limitation in function refers to suspension of the function.

13. The data relay apparatus according to claim 1, wherein only when data is relayed from the one port to another port, the function control unit considers as data reception.

14. A data relay apparatus that performs data transfer from one port to another port, the data relay apparatus comprising:
a transmitting unit and a receiving unit provided for each port;
a relay processing unit provided between the receiving unit at the one port and the transmitting unit at another port, and performing a data transfer relay process; and
a function control unit that performs function control to limit a receive function of the receiving unit at the one port to reduce power consumption and thereafter allow the receive function to recover when a predetermined recovery condition is satisfied, the function control unit performing the function control based on an instruction when the instruction to perform the function control is received from a communication partner connected to the one port, whereas the function control unit notifies information about the function control to the communication partner when the data relay apparatus performs the function control itself independent of the instruction,
wherein when the function control unit performs the function control to limit a function itself instead of by an instruction from the communication partner, the function control unit postpones an actual performing of the function control to limit a function, during a period of time required from when a notification indicating the limitation reaches the communication partner until data having already been transmitted before the communication partner stops transmission reaches the data relay apparatus.

15. A data relay apparatus that performs data transfer from one port to another port, the data relay apparatus comprising:
a transmitting unit and a receiving unit provided for each port;
a relay processing unit provided between the receiving unit at the one port and the transmitting unit at another port, and performing a data transfer relay process; and
a function control unit that performs function control to limit a receive function of the receiving unit at the one port to reduce power consumption and thereafter allow the receive function to recover when a predetermined recovery condition is satisfied, the function control unit performing the function control based on an instruction when the instruction to perform the function control is received from a communication partner connected to the one port, whereas the function control unit notifies information about the function control to the communication partner when the data relay apparatus performs the function control itself independent of the instruction,
wherein when the function control unit performs the function control to limit a function itself instead of by an instruction from the communication partner, the function control unit postpones an actual performing of the function control to limit a function until a notification indicating recognition reaches from the communication partner after a notification indicating the limitation reaches the communication partner and is recognized by the communication partner.

16. A function control method for a data relay apparatus that performs a relay process on data received from one port, to transmit the data from another port, the method comprising: performing function control to limit a receive function of a receiving unit at the one port to reduce power consumption and thereafter allowing the receive function to recover when a predetermined recovery condition is satisfied, the function control being performed based on an instruction when the instruction to perform the function control is received from a communication partner connected to the one port, whereas information about the function control is notified to the communication partner when the data relay apparatus performs the function control itself independent of the instruction, wherein in addition to the function control targeted for the receiving unit, performing function control to limit a transmit function of a transmitting unit at a same port as the receiving unit to reduce power consumption, and to allow the transmit function to recover when the recovery condition is satisfied, wherein the function control unit measures a frequency of receiving data from the communication partner and performs the function control to limit a function when the measured frequency is less than or equal to a predetermined value.

\* \* \* \* \*